US008650283B1

(12) United States Patent
Chang et al.

(10) Patent No.: US 8,650,283 B1
(45) Date of Patent: Feb. 11, 2014

(54) CONTENT DELIVERY TECHNOLOGY

(75) Inventors: Jack H. Chang, Saratoga, CA (US);
William H. Sheu, Fremont, CA (US);
Sherman Tuan, Cupertino, CA (US)

(73) Assignee: PurpleComm Inc., Santa Clara, CA (US)

( * ) Notice: Subject to any disclaimer, the term of this patent is extended or adjusted under 35 U.S.C. 154(b) by 213 days.

(21) Appl. No.: 12/794,970

(22) Filed: Jun. 7, 2010

(51) Int. Cl.
*G06F 15/16* (2006.01)

(52) U.S. Cl.
USPC ........................................................ 709/224

(58) Field of Classification Search
USPC ........................................................ 709/224
See application file for complete search history.

(56) References Cited

U.S. PATENT DOCUMENTS

| | | | | |
|---|---|---|---|---|
| 6,248,946 B1 * | 6/2001 | Dwek | .............................. | 84/609 |
| 6,289,455 B1 * | 9/2001 | Kocher et al. | .................. | 713/194 |
| 6,328,570 B1 * | 12/2001 | Ng | .............................. | 434/307 A |
| 6,477,509 B1 * | 11/2002 | Hammons et al. | ........... | 705/26.8 |
| 6,480,961 B2 * | 11/2002 | Rajasekharan et al. | ......... | 726/27 |
| 6,560,651 B2 * | 5/2003 | Katz et al. | ..................... | 709/229 |
| 7,089,579 B1 * | 8/2006 | Mao et al. | ...................... | 725/109 |
| 7,225,456 B2 * | 5/2007 | Kitsukawa et al. | ............. | 725/43 |
| 7,706,740 B2 * | 4/2010 | Collins et al. | ................. | 455/3.01 |
| 7,881,656 B2 * | 2/2011 | Khedouri et al. | ............ | 455/3.01 |
| 8,321,895 B2 * | 11/2012 | Verhaegh et al. | ................ | 725/58 |
| 2002/0184634 A1 | 12/2002 | Cooper | | |
| 2003/0110503 A1 | 6/2003 | Perkes | | |
| 2003/0221197 A1 * | 11/2003 | Fries et al. | ..................... | 725/117 |
| 2004/0044723 A1 * | 3/2004 | Bell et al. | ...................... | 709/203 |
| 2005/0049934 A1 * | 3/2005 | Nakayama et al. | ............. | 705/26 |
| 2005/0081244 A1 | 4/2005 | Barrett et al. | | |
| 2005/0219640 A1 * | 10/2005 | Kasatani | ........................ | 358/402 |
| 2006/0031114 A1 * | 2/2006 | Zommers | ........................ | 705/10 |
| 2006/0075428 A1 | 4/2006 | Farmer et al. | | |
| 2006/0080031 A1 * | 4/2006 | Cooper et al. | ................ | 701/208 |
| 2006/0112268 A1 * | 5/2006 | Kamiya et al. | ................ | 713/165 |
| 2006/0120560 A1 * | 6/2006 | Davis et al. | ..................... | 382/100 |
| 2007/0277219 A1 | 11/2007 | Toebes et al. | | |
| 2008/0022320 A1 | 1/2008 | Ver Steeg | | |
| 2008/0115182 A1 | 5/2008 | Van Willigenburg | | |
| 2008/0263633 A1 * | 10/2008 | Banga et al. | ....................... | 726/3 |
| 2009/0125510 A1 * | 5/2009 | Graham et al. | .................... | 707/5 |
| 2010/0049966 A1 * | 2/2010 | Kato | .............................. | 713/153 |
| 2010/0150395 A1 * | 6/2010 | Davis et al. | ..................... | 382/100 |
| 2011/0023060 A1 * | 1/2011 | Dmitriev et al. | ................. | 725/34 |
| 2011/0035280 A1 * | 2/2011 | Fordyce et al. | ............ | 705/14.53 |
| 2011/0035288 A1 * | 2/2011 | Clyne | .......................... | 705/14.71 |
| 2011/0047072 A1 * | 2/2011 | Ciurea | ............................ | 705/39 |
| 2011/0083196 A1 * | 4/2011 | Graham et al. | .................. | 726/27 |
| 2011/0087550 A1 * | 4/2011 | Fordyce et al. | ............ | 705/14.65 |
| 2011/0093892 A1 * | 4/2011 | Arnold et al. | .................... | 725/38 |

(Continued)

FOREIGN PATENT DOCUMENTS

WO        WO2006041784 A2        4/2006

*Primary Examiner* — Karen Tang
(74) *Attorney, Agent, or Firm* — Fish & Richardson P.C.

(57) ABSTRACT

Content delivery technology, in which a request to download a content file to a downloader device is received from a remote device and the downloader device associated with the received request is identified. Address information for the content file associated with the received request is determined and a communication session is established with the downloader device based on the identification of the downloader device associated with the received request. The determined address information for the content file is sent to the downloader device over the established communication session, thereby enabling the downloader device to download the content file associated with the request.

20 Claims, 16 Drawing Sheets

(56) References Cited

U.S. PATENT DOCUMENTS

| | | | |
|---|---|---|---|
| 2011/0217960 A1* | 9/2011 | Tanaka et al. | 455/414.1 |
| 2011/0231658 A1* | 9/2011 | Nair | 713/165 |
| 2011/0264677 A1* | 10/2011 | Hermitage et al. | 707/758 |
| 2011/0265136 A1* | 10/2011 | Liwerant et al. | 725/112 |
| 2011/0302011 A1* | 12/2011 | Yoder et al. | 705/14.17 |
| 2012/0084813 A1* | 4/2012 | Dmitriev et al. | 725/34 |

* cited by examiner

300

```
┌─────────────────────────────────────────────┐
│ RECEIVE A REQUEST TO DOWNLOAD A CONTENT     │
│ FILE TO A DOWNLOADER DEVICE THAT IS LOCATED │
│              IN A USER'S HOME           302 │
└─────────────────────────────────────────────┘
                      ↓
┌─────────────────────────────────────────────┐
│  IDENTIFY THE DOWNLOADER DEVICE ASSOCIATED  │
│      WITH THE RECEIVED REQUEST          304 │
└─────────────────────────────────────────────┘
                      ↓
┌─────────────────────────────────────────────┐
│      DETERMINE ADDRESS INFORMATION FOR THE  │
│  CONTENT FILE ASSOCIATED WITH THE RECEIVED  │
│                 REQUEST                 306 │
└─────────────────────────────────────────────┘
                      ↓
┌─────────────────────────────────────────────┐
│ ESTABLISH A COMMUNICATION SESSION WITH THE  │
│             DOWNLOADER DEVICE           308 │
└─────────────────────────────────────────────┘
                      ↓
┌─────────────────────────────────────────────┐
│   SEND THE DETERMINED ADDRESS INFORMATION   │
│  FOR THE CONTENT FILE TO THE DOWNLOADER     │
│                  DEVICE                 310 │
└─────────────────────────────────────────────┘
```

```
IN RESPONSE TO A RECEIVED REQUEST, IDENTIFY
ATTRIBUTE(S) OF A USER AND/OR DEVICE FROM
WHICH THE REQUEST WAS RECEIVED    1402
                    ↓
PERFORM AN AUTHENTICATION PROCESS USING
THE IDENTIFIED ATTRIBUTE(S)    1404
                    ↓
DETERMINE WHETHER OR NOT TO PROCESS THE
REQUEST BASED ON RESULTS OF THE
AUTHENTICATION PROCESS    1406
                    ↓
IN RESPONSE TO DETERMINATION TO PROCESS THE
REQUEST, CONTROL DOWNLOADER TO DOWNLOAD
CONTENT FILE ASSOCIATED WITH REQUEST  1408
                    ↓
IN RESPONSE TO DETERMINATION NOT TO PROCESS
THE REQUEST, IGNORE REQUEST AND SEND ERROR
MESSAGE    1410
```

FIG. 14

CONTENT DELIVERY TECHNOLOGY

FIELD

The present disclosure generally relates to content delivery technology.

BACKGROUND

Content viewers today are exposed to an overwhelming amount of information and are challenged by the degree of interaction and personalization needed to manage this massive amount of information. In an era of digital communications, a user may be confused by an array of technology including traditional analog televisions, DVRs (Digital Video Recorders), PVRs (Personal Video Recorders), media centers, EPG (Electronic Program Guide)-based systems, Internet-related content, and traditional remote control devices.

SUMMARY

In one aspect, a method of controlling a downloader device to download content includes receiving, at a network server system and from a remote device, a request to download a content file to a downloader device that is different than the remote device. The request includes identification information sufficient to enable the network server system to identify the downloader device. The method also includes, based on the identification information, identifying, by the network server system and from among multiple, different downloader devices, the downloader device associated with the received request and determining, by the network server system and based on the received request, address information for the content file associated with the received request. The method further includes establishing, by the network server system, a communication session with the downloader device based on the identification of the downloader device associated with the received request and sending the determined address information for the content file associated with the received request to the downloader device over the established communication session, thereby enabling the downloader device to download the content file associated with the request.

Implementations may include one or more of the following features. For example, the method may include receiving, from a web server that provides content file directory and listing, a request to download a content file that is listed by the web server and that has been selected by the user through the web server. In this example, the request may include a link related to the content file. In addition, the method may include extracting the link related to the content file from the received request and sending, to the downloader device over the established communication session, the extracted link related to the content file, thereby enabling the downloader device to download the content file using the extracted link.

In some implementations, the method may include receiving, from a communications server, an electronic communication having a recipient address that corresponds to at least one of the multiple, different downloader devices and including a link related to a content file and mapping the recipient address of the received electronic communication to the downloader device. In these implementations, the method may include parsing the link related to the content file from the received electronic communication and sending, to the downloader device over the established communication session, the parsed link related to the content file, thereby enabling the downloader device to download the content file using the parsed link.

In some examples, the method may include receiving, from a communications server, an electronic communication having a recipient address that corresponds to at least one of the multiple, different downloader devices and including an attached content file and mapping the recipient address of the received electronic communication to the downloader device. In these examples, the method may include extracting the attached content file from the received electronic communication and determining whether a previously-stored version of the extracted content file exists in electronic storage accessible by the network server system. In response to a determination that a previously-stored version of the extracted content file exists in electronic storage accessible by the network server system, download information that enables downloading of the previously-stored version of the extracted content file may be identified and the address information for the content file associated with the received request may be determined as the identified download information. In response to a determination that a previously-stored version of the extracted content file does not exist in electronic storage accessible by the network server system, a new version of the extracted content file may be stored in electronic storage accessible by the network server system, download information may be created that enables downloading of the new version of the extracted content file, and the address information for the content file associated with the received request may be determined as the created download information.

Further, the method may include segmenting the extracted content file into multiple segments, generating a download control file that identifies the multiple segments of the extracted content file and includes a tracker that identifies one or more peers in a network at which one or more of the multiple segments of the extracted content file are available for download, and creating a link to the download control file. In addition, the method may include determining the address information for the content file associated with the received request as the link to the download control file.

Also, the method may include determining, by the network server system and based on the received request, whether the attached content file is to be maintained as a private file. In response to a determination that the attached content file is to be maintained as a private file, access to the attached content file may be controlled to prevent downloader devices other than the downloader device from accessing the attached content file. In response to a determination that the attached content file is to be maintained as a public file, the attached content file may be made available to downloader devices other than the downloader device.

In some implementations, the method may include receiving, from a communications server, an electronic communication having a recipient address that corresponds to at least one of the multiple, different downloader devices and including a link to streaming content and mapping the recipient address of the received electronic communication to the downloader device. In these implementations, the method may include parsing the link to streaming content from the received electronic communication, determining that the parsed link corresponds to streaming content, and, in response to the determination that the parsed link corresponds to streaming content, determining whether a previously-stored downloadable file of the streaming content exists in electronic storage accessible by the network server system. In response to a determination that a previously-stored downloadable file of the streaming content exists in electronic storage accessible by the network server system, download information may be identified that enables downloading of the previously-stored downloadable file of the streaming content and the address information for the content file associated with the received request may be determined as the identified download information. In response to a determination that a previously-stored downloadable file of the streaming content does not exist in electronic storage accessible by the network server system, the streaming content may be retrieved using the parsed link, the retrieved content may be formatted into a new downloadable and playable file, the new downloadable and playable file may be stored in electronic storage accessible by the network server system, download information may be created that enables downloading of the new downloadable and playable file, and the address information for the content file associated with the received request may be determined as the created download information. The retrieved content may be transcoded.

In some examples, the method may include receiving, from a communications server, an electronic communication having a recipient address that corresponds to at least one of the multiple, different downloader devices and including a link to streaming content and mapping the recipient address of the received electronic communication to the downloader device. In these examples, the method may include parsing the link to streaming content from the received electronic communication, determining that the parsed link corresponds to streaming content, and, in response to the determination that the parsed link corresponds to streaming content, retrieving the streaming content using the parsed link. The method also may include, based on the retrieved content, determining whether a previously-stored downloadable file of the streaming content exists in electronic storage accessible by the network server system. In response to a determination that a previously-stored downloadable file of the streaming content exists in electronic storage accessible by the network server system, download information may be identified that enables downloading of the previously-stored downloadable file of the streaming content, the address information for the content file associated with the received request may be determined as the identified download information, and the retrieved content may be discarded. In response to a determination that a previously-stored downloadable file of the streaming content does not exist in electronic storage accessible by the network server system, the retrieved content may be formatted into a new downloadable and playable file, the new downloadable and playable file may be stored in electronic storage accessible by the network server system, download information may be created that enables downloading of the new downloadable and playable file, and the address information for the content file associated with the received request may be determined as the created download information.

The method may include receiving, from a user device, a login request to log into the network server system, authenticating, by the network server system, the login request and identifying a user associated with the login request, and, subsequent to authenticating the login request, receiving, from the user device, a link related to a content file. The method also may include identifying the downloader device corresponding to the user associated with the login request and identifying the link related to the content file received from the user device. The method further may include sending, to the downloader device over the established communication session, the link related to the content file received from the user device, thereby enabling the downloader device to download the content file using the link.

Further, the method may include, in response to receiving the request to download the content file to the downloader device, identifying at least one attribute of a user and/or a device from which the request was received, performing an authentication process using the identified at least one attribute of the user and/or the device, and determining whether or not to process the received request based on results of the authentication process. In response to a determination to process the received request, the downloader device may be controlled to download the content file associated with the received request. In response to a determination not to process the received request, the received request may be ignored and an error message may be sent to the user and/or the device from which the request was received.

In addition, the method may include determining whether the user and/or the device is eligible to control the downloader device to download files by performing at least one of whitelisting and blacklisting. The method may include determining that the user and/or the device is eligible to download a subset of available content to the downloader device based on a type of the available content and determining a type of the content file associated with the received request. The method also may include comparing the determined type of the content file associated with the received request to the type of available content the user and/or the device is eligible to download and determining whether the user and/or the device is eligible to download the content file associated with the received request based on the comparison of the determined type of the content file associated with the received request to the type of available content the user and/or the device is eligible to download.

Further, the identification information sufficient to enable the network server system to identify the downloader device may include a user identifier and the method may include mapping the user identifier to a device identifier for the downloader device that corresponds to the user identifier. The identification information sufficient to enable the network server system to identify the downloader device also may include a device identifier for the downloader device and the method may include parsing the device identifier for the downloader device from the received request.

In some implementations, the method may include sending a command to download content using the determined address information for the content file associated with the received request to the downloader device over the established communication session. The method also may include assigning, by the network server system, communication addresses to the multiple, different downloader devices controlled by the network server system and allowing a user of the network server system to push content to the user's downloader device by sending an electronic communication to a communication address assigned to the user's downloader device by the network server system. The method further may include controlling at least one downloader device of the multiple, different downloader devices to differentiate content based on an identity of a user that requested the content to be downloaded to the at least one downloader device such that content downloaded in response to requests received from a first user is distinguished from content downloaded in response to requests received from a second user that is different than the first user.

In another aspect, a system includes at least one computer and at least one computer-readable medium coupled to the at least one computer having instructions stored thereon which, when executed by the at least one computer, causes the at least one computer to perform operations. The operations include receiving, from a remote device, a request to download a content file to a downloader device that is different than the remote device. The request includes identification information sufficient to enable the network server system to identify the downloader device. The operations also include, based on the identification information, identifying, from among multiple, different downloader devices, the downloader device associated with the received request and determining, based on the received request, address information for the content file associated with the received request. The operations further include establishing a communication session with the downloader device based on the identification of the downloader device associated with the received request and sending the determined address information for the content file associated with the received request to the downloader device over the established communication session, thereby enabling the downloader device to download the content file associated with the request.

In yet another aspect, at least one computer-readable storage medium is encoded with at least one computer program comprising instructions that, when executed, operate to cause a computer to perform operations. The operations include receiving, from a remote device, a request to download a content file to a downloader device that is different than the remote device. The request includes identification information sufficient to enable the network server system to identify the downloader device. The operations also include, based on the identification information, identifying, from among multiple, different downloader devices, the downloader device associated with the received request and determining, based on the received request, address information for the content file associated with the received request. The operations further include establishing a communication session with the downloader device based on the identification of the downloader device associated with the received request and sending the determined address information for the content file associated with the received request to the downloader device over the established communication session, thereby enabling the downloader device to download the content file associated with the request.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 3, 5, 7, 9, 11, 13, and 14 are flowcharts of exemplary processes.

Like reference numbers represent corresponding parts throughout.

DETAILED DESCRIPTION

Figure 1:
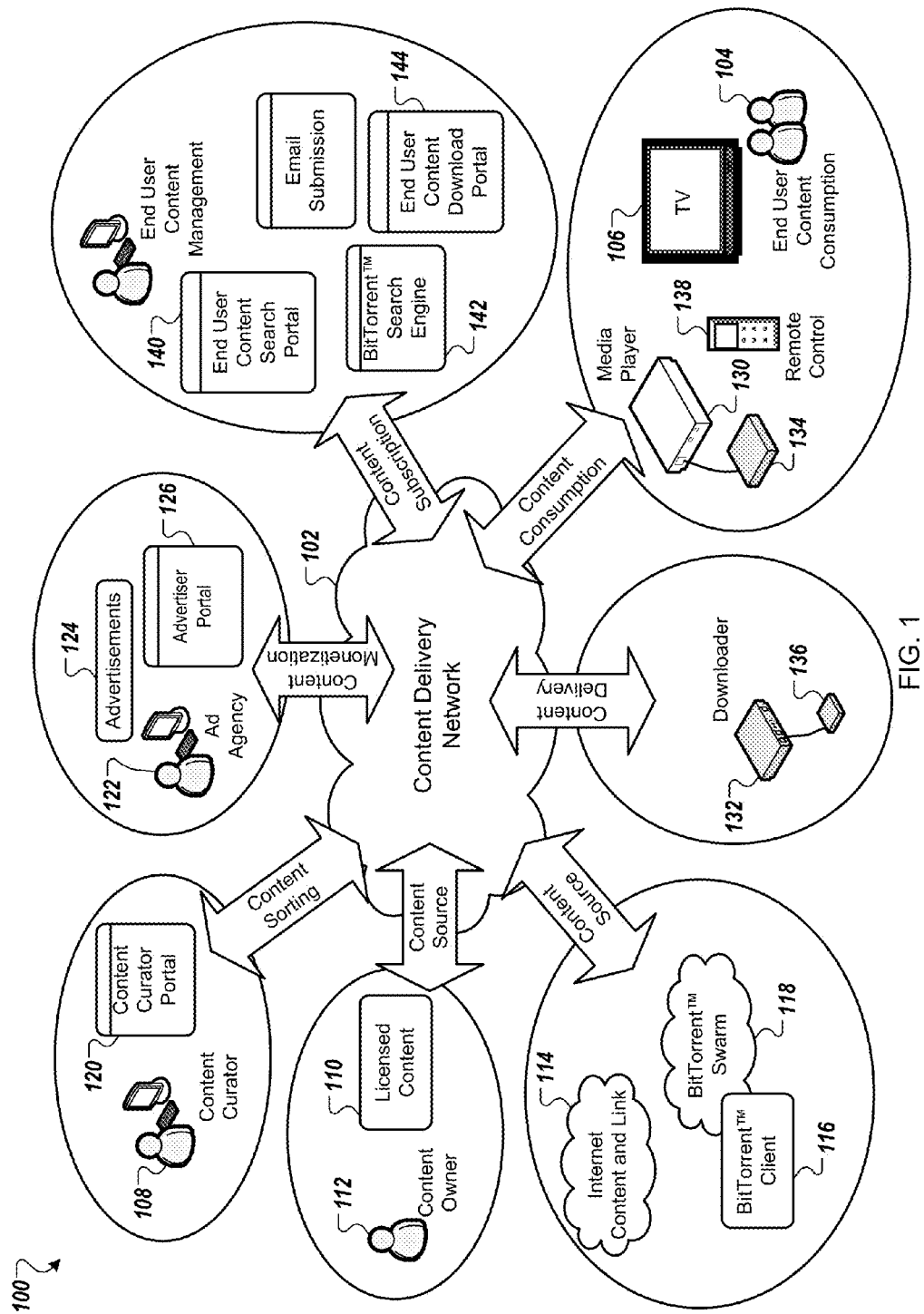
FIGS. 1, 2, 4, 6A, 8, 10, 12, and 15 are diagrams of exemplary systems.

FIG. 1 illustrates a content delivery system 100. The system 100 provides support for various aspects of content delivery, such as content sourcing, content sorting, content monetization, content subscription, content download, and content consumption. The content delivery system 100 includes a content delivery network 102. The content delivery network 102 may be one or more public or private, wired or wireless networks, such as the Internet or a Session Initiated Protocol (SIP) network such as the PsipTN™ network offered by TelTel™. Using the system 100, end users 104 may view channels, for example, on a television 106 located in their home. Channels may be defined by end users 104, or by "content curators" 108.

Multiple types of content, such as audio (e.g., music, podcasts), video, and still images (e.g., photographs), may be made available over the content delivery network 102. Licensed and license-free content may be made available. For example, licensed content 110 may be acquired from a content owner 112.

Content may be made available from a variety of sources. For example, Internet content may be accessed from an Internet link 114 (e.g., URL (Uniform Resource Locator)). Content may also be accessed from peer-to-peer networks. For example, content may be accessed from one or more BitTorrent™ clients 116 which are part of one or more BitTorrent™ "swarms" 118. Content may be accessed from other sources, such as from a television broadcast (e.g., MSO (Multiple System Operator), cable, satellite, local) or from content (e.g., photographs, audio, previously recorded video) available from devices (e.g., DVR, stereo, computer, DVD (Digital Video Disc) player) connected to a user's home network and/or located in a user's home.

Content curators 108 may use a content curator portal 120 to define custom channels which may be made available for subscription by end users 104. The content curators 108 may be commissioned to search for, select, and organize multiple types of content from various sources into channels. Content curators 108 may, for example, organize channels by topic or genre. Content curators 108 may, for example, select licensed content, license-free content, BitTorrent™ content, or content from their private collection, to name a few examples.

Channels may be offered for free to end users 104 or end users 104 may subscribe to channels on a fee basis. Users may rate or rank channels or content curators based, for example, on programming selection, sequencing, and quality. Content curators 108 may be promoted, for example, based on popularity.

Content owners 112 may be compensated for the use of licensed content 110 that they own which is used in channels defined by content curators 108. For example, the system 100 may provide support for digital rights management (DRM). By allowing access to their licensed content 110, content owners 112 may experience increased distribution and revenue and targeted exposure in channels focused on providing content related to a topic of the licensed content 110. Multiple revenue agreements may be possible, such as per-use agreements, subscription revenue sharing, and advertisement revenue sharing.

A content curator 108 may work with one or more advertisers 122, such as an ad agency, to include advertisements 124 on a channel. For example, an advertisement may be displayed if a user switches which channel is being viewed or when a program on a selected channel finishes. As another example, advertisements may be displayed on the display of a remote control device, such as while a program is being displayed on a television. Content curators 108, advertisers 122, and content owners 112 may share advertising revenue. Sharing in advertising revenue may provide an incentive for content curators 108 to create interesting and popular channels. A content curator 108 may work with one or more advertisers 122 to create one or more advertisements 124 which are customized and targeted for one or more particular channels. End users 104 may customize advertisement viewing preferences, such as by specifying preferred topics, preferred or excluded companies, region preferences, etc.

Advertisers 122 may use an advertiser portal 126 to upload advertisements 124 and to control advertisement publication. Advertisers 122 may define and apply advertisement insertion rules to particular advertisements 124 and/or may allow a content curator 108 to decide when and how to insert the advertisements 124 into channels defined by the content curator 108. APIs (Application Programming Interfaces) may be provided which allow advertisers 122 to enable the system 100 to interface with standard advertisement inventory management systems to allow for control and management of advertisements 124. Various advertisement pricing plans may be supported, such as individually-priced ads or bulk pricing. Other advertising features may be included, such as online purchasing of items or providing customer contact options.

Advertisers 122, content curators 108, and content owners 112 may access user viewing behavior data. Advertisers 122 may access user viewing behavior data, such as viewed channels, viewed content, viewed advertisements, advertisement display frequency, advertisement viewed length, user actions during advertisement display, user characteristics, advertisement and content view times, advertisement and content view counts, and hosting channel information, to monitor reach and performance of advertising campaigns. Advertisements may be targeted to specific users based on recorded user viewing behavior data. Content curators 108 may access user viewing behavior data to learn about behaviors of end users 104 who subscribe to their channels. Content owners 112 may access user viewing behavior data to learn about their fan base, such as accessing information about user demographics, time of day of access, and user actions during content display. Content presentation and playback may be customized and personalized for a particular end user 104, based specifically on recorded user viewing behavior of the particular end user 104 and generally on recorded user viewing behavior of all users.

User viewing behavior data may be captured, for example, by a media player 130 and/or a downloader device 132. The media player 130 and/or the downloader device 132 may play content included or ordered on a channel defined by a content curator 108. In some implementations, the media player 130 may play content downloaded from the content delivery network 102 by the downloader device 132. In some implementations, the media player 130 and the downloader device 132 are different logical functions of the same physical device. In other implementations, the media player 130 and the downloader device 132 are different physical devices. In some implementations, the media player 130 is a software application which may be executed, for example, on a computing device such as a desktop or laptop computer.

The media player 130 and/or the downloader device 132 may be connected to external media storage devices 134, 136 respectively. The external media storage devices 134, 136 may be, for example, USB (Universal Serial Bus) drives. The external media storage devices 134, 136 may be used, for example, to transfer data to/from the media player 130 or the downloader device 132, respectively, such as to transfer data to/from a computing device.

The media player 130 and/or the downloader device 132 may communicate wirelessly with one or more remote control devices 138. The end user 104 may navigate through channels and perform other functions using the remote control device 138. The remote control device 138 may communicate (e.g., using Infrared (IR) technology of radio frequency (RF) technology) with the television 106, the media player 130, and/or the downloader device 132. The remote control device 138 also may communicate over a network with the media player 130 and/or the downloader device 132 to control functions of the media player 130 or the downloader device 132. The remote control device 138 may include a small display screen that displays preview content and/or advertisements.

The media player 130 and/or the downloader device 132 may download content from the content delivery network 102 without consuming resources of a computing device owned by the end user 104. For example, content may be downloaded into the home of an end user 104 without using resources of a personal computer owned by the end user 104. The media player 130 and the downloader device 132 may use less electricity than a personal computer, thus reducing the electric bill of the end user 104. The media player 130 and/or the downloader device 132 may connect to other computing devices connected on a user's home network. The media player 130 and/or the downloader device 132 may include built-in functionality to communicate with and download information from a peer-to-peer network, such as the BitTorrent™ swarm 118.

The end user 104 may search for and subscribe to content using an end-user content search portal 140. For example, the end-user content search portal 140 may provide a directory listing of available defined channels. The directory listing may be organized in a hierarchy of categories and sub-categories. A particular channel may appear in one or more categories or sub-categories. The end-user content search portal 140 may also provide a search function to allow end users to search for available defined channels based on a keyword search. As another example, users may search for channels based on other criteria, such as sorting channels based on channel or content curator popularity or ranking. An end user may subscribe to a defined channel, for example, by selecting a channel link displayed in a directory listing or in a list of search results.

The end user 104 may also search for and initiate download of individual content items to the downloader device 132 using a partner site such as a BitTorrent™ search engine 142. As another example, the end user 104 may send an email which includes a content link to an email address associated with their downloader device 132 to initiate an automatic download to the downloader device 132 of the content linked to by the content link. The content link may refer to a content file available on the Internet, and may be a reference to a video resource available from a streaming video website. The end user 104 may send an email with an attachment to an email address associated with the downloader device 132, to initiate a download of the attachment to the downloader device 132. The end user 104 may use an end-user content download portal 144 to search for and to select content to download to the downloader device 132.

Figure 2:
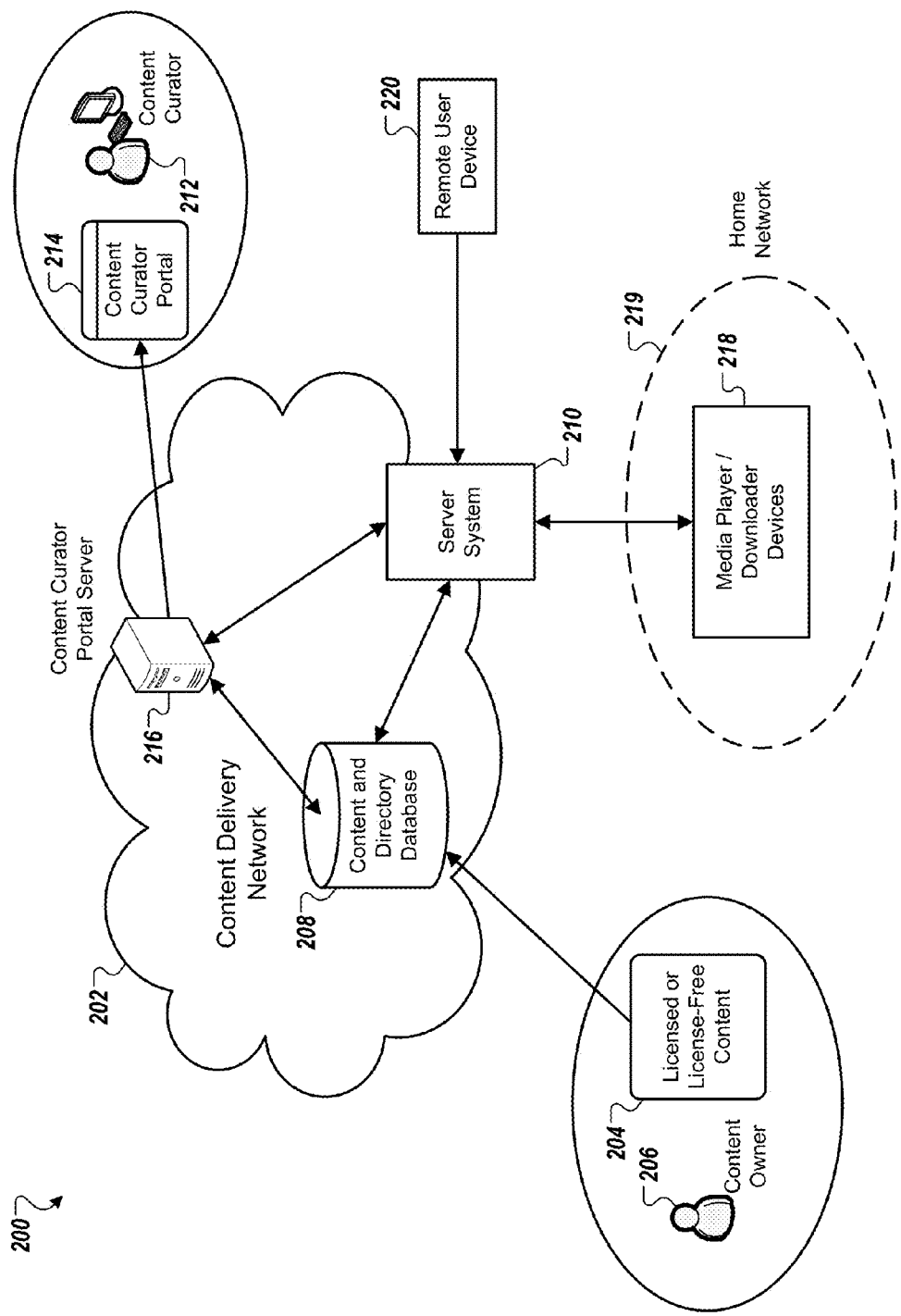

FIG. 2 illustrates a system 200 for content sourcing and download over a content delivery network 202. Licensed or license-free content 204 is acquired from one or more content owners 206 or from a publicly available source, such as the Internet. For example, content owners 206 may transfer content over the content delivery network 202 to a content and directory database 208. Content may also be transferred to the content and directory database 208 from a server system 210, such as using a DVD or CD (Compact Disc) drive. License-free content, such as license-free video or podcasts, may be downloaded from the Internet and stored in the content and directory database 208. In some implementations, some or all content may be stored in the content and directory database 208 as BLOBs (Binary Large Objects). In some implementations, some or all content may be stored in the file system of the server system 210 and references to file system locations may be stored in the content and directory database 208.

The content and directory database 208 stores information about content and also information about defined channels. Content curators 212 may use a content curator portal 214 to define channels and to manage defined channels. The content curator portal 214 may display a listing of licensed and license-free content available in the content and directory database 208. The content curator portal 214 may also provide a search function which allows the content curator 212 to search for content available in the content and directory database 208 and to also search for content included in the private collection of the content curator 212 or content available on the Internet, such as content available from peer-to-peer networks, such as BitTorrent™.

The content curator portal 214 may communicate with a content curator server 216. For example, a channel definition defined using the content curator portal 214 may be sent to the content curator server 216, which may communicate with the server system 210 to request that the channel definition be stored in the content and directory database 208. As another example, information for existing channel definitions associated with a particular content curator 212 may be retrieved from the content and directory database 208 and sent from the content curator portal server 216 to the content curator portal 214 for display.

In some implementations, the content curator portal server 216 is one physical server computing device and in other implementations, the content curator portal server 216 includes multiple physical server computing devices. Similarly, in some implementations, the server system 210 is one physical server computing device, and in other implantations, the server system 210 includes multiple physical server computing devices. In some implementations, multiple physical server computing devices are used, with some or all server computing devices implementing both the content curator portal server 216 and the server system 210. In some implementations, one physical server computing device is used, with the one physical server device implementing both the content curator portal server 216 and the server system 210.

The network 202 may be one or more public or private, wired or wireless networks, such as the Internet, or may be a Session Initiated Protocol (SIP) network such as the PsipTN™ network offered by TelTel™. The network 202 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. The network 202 may include multiple networks or subnetworks, each of which may include, for example, a wired or wireless data pathway.

Content may be downloaded to one or more user media player/downloader devices 218 included in a user's home network 219. For example, content corresponding to a user-subscribed channel may be automatically downloaded to the media player/downloader device 218, in response to a user selection of a corresponding channel. As another example, a user may search for and download content to the media player/downloader device 218. A user may, using a remote user device 220, monitor and manage user-initiated downloads. The remote user device 220 may be any type of electronic device configured to exchange communications with the server system 210 over a network. The remote user device 220 may be a general-purpose computer (e.g., a desktop personal computer, a workstation, or a laptop computer), a mobile or wireless device, or a device designed for a specific function (e.g., a cell phone, a smart phone, a tablet PC, a personal digital assistant (PDA), etc.).

FIG. 3 illustrates a process 300 for sending download information to a media player/downloader device. The operations of the process 300 are described generally as being performed by the system 200. The operations of the process 300 may be performed by one of the components of the system 200 (e.g., the server system 210) or may be performed by a combination of the components of the system 200. In some implementations, operations of the process 300 may be performed by one or more processors included in one or more electronic devices.

The system 200 receives a request to download a content file to a media player/downloader device that is located in a user's home (302). For example, the system 200 may receive a request corresponding to a user selecting a link on a download website or on a search engine website. The system 200 may receive a link to a content file or a link to download information (e.g., a BitTorrent™ torrent file) for a content file. As another example, the system 200 may receive an electronic communication (e.g., email, text message, or instant message) from an end user which may include a link to a content file, a link to download information for a content file, a link to streaming content, or an attached content file.

The system 200 identifies the media player/downloader device associated with the received request (304). For example, the request received by the system 200 may include a user identifier, and the user identifier may be parsed from the request and mapped to a device identifier (e.g., using a table which maps user identifiers to device identifiers). As another example, the request received by the system 200 may include a device identifier for a particular media player/downloader device.

The system 200 determines address information for the content file associated with the received request (306). The address information may include an address on a network at which the content file is made available for access (e.g., an Internet address). For instance, the system 200 may identify a torrent file received with the request. The torrent file may include metadata about the content file to be shared and about a tracker (e.g., a computer) that coordinates distribution of the content file. Peers that want to download the content file first obtain the torrent file and connect to the tracker to identify other peers from which to download pieces of the content file.

As another example, if the content is streaming content or an attached file, the system 200 may determine whether the streaming content or attached file content already exists in storage. If the streaming content or attached file content already exists in storage, the system 200 may identify and retrieve download information (e.g., a torrent file) for the streaming content or attached file content. If the streaming content or attached file content does not exist in storage, the system 200 may store the streaming content or attached file content in storage and create (and store) download information (e.g., a torrent file) for the streaming content or attached file content. If a torrent file is created, it may be associated with a private tracker (e.g., to prevent unauthorized users from accessing the streaming content). Streaming content may be retrieved from a streaming website.

The system 200 establishes a communication session with the media player/downloader device (308). For example, a SIP (Session Initiation Protocol) session may be established between the media player/downloader device and one or more servers, such as a host user agent server or a SIP edge server. The system 200 may implement ICE (Interactive Connectivity Establishment) and may employ STUN (Session Traversal Utilities for Network address translation) and TURN (Traversal Using Relay Network address translation) components as part of a NAT (Network Address Translation) traversal solution. NAT and firewall traversal describes techniques that establish and maintain TCP/IP (Transmission Control Protocol/Internet Protocol) network connections traversing NAT gateways. ICE is a technique for discovering optimal solutions for NAT traversal for UDP (User Datagram Protocol)-based multimedia sessions established with an offer/answer model. STUN techniques may identify a public address operated through a NAT or multiple NATs, together with a category of NAT in use and an Internet-side port associated by the NAT with a particular local port. With the public address, NAT category and port information, STUN is able to organize UDP communications between two hosts located behind NAT routers. TURN is a protocol that allows for an element behind a NAT or firewall to receive incoming data over TCP or UDP connections.

The system 200 sends the determined address information for the content file to the media player/downloader device (310). For example, a torrent file associated with the content file or a link to a torrent file associated with the content file may be sent to the media player/downloader device. If the address information is a link to a torrent file, the media player/downloader device may download the torrent file (e.g., using HTTP, over the Internet). The media player/downloader device may use the received or downloaded torrent file to download the associated content file from one or more BitTorrent™ clients in one or more BitTorrent™ swarms.

Figure 4:
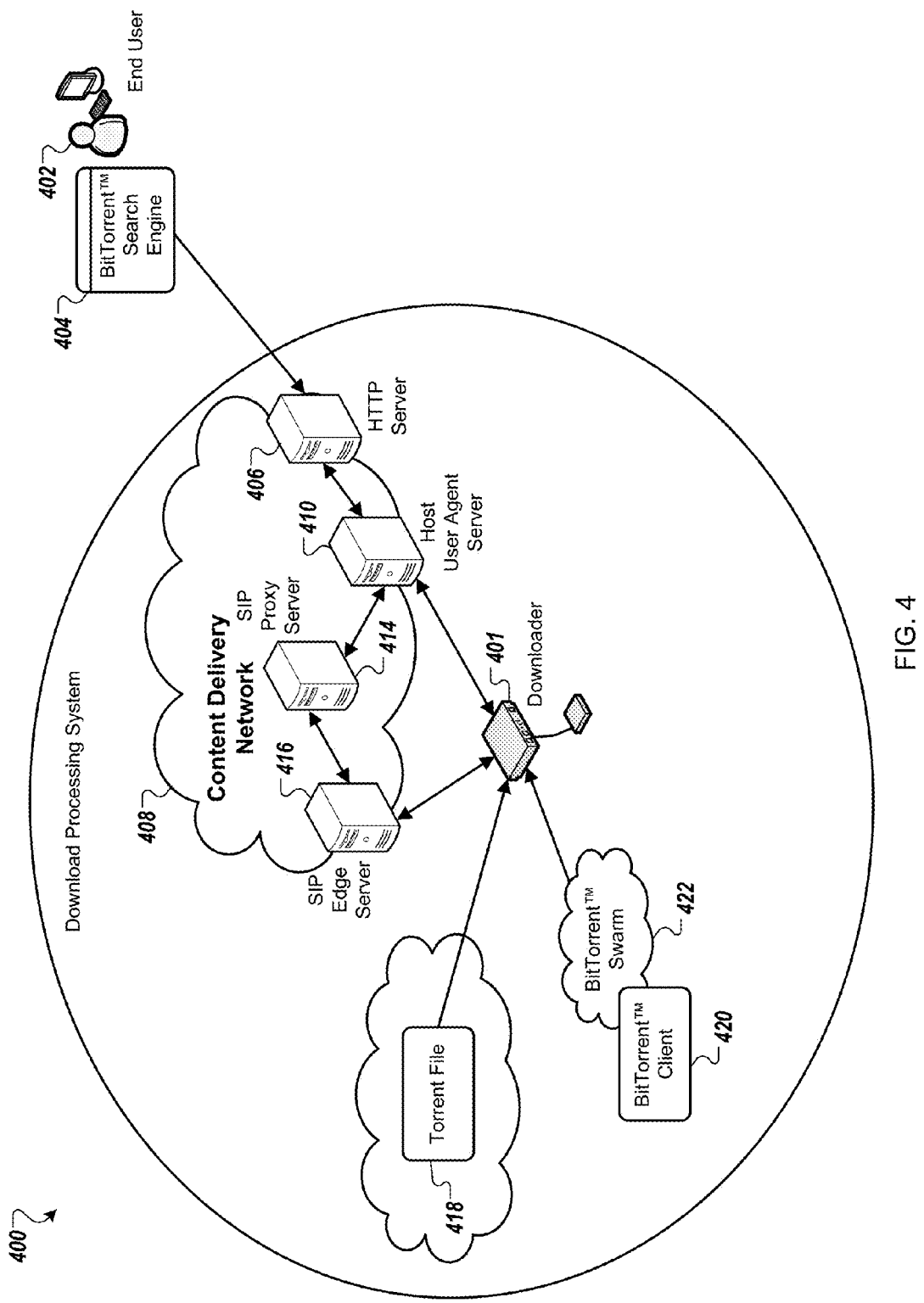

FIG. 4 illustrates an exemplary system 400 for downloading content to a media player/downloader device 401. An end user 402 may use a search engine 404 to search for content. The search engine 404 may be, for example, a BitTorrent™ search engine which allows the end user 402 to browse and search a content directory. To select a content file for download, the user may, for example, select a link in the directory or in a search results list.

In response to a user selecting a link on the search engine 404, a request to download an associated content file may be sent to an HTTP (HyperText Transfer Protocol) server 406 over a content delivery network 408. The request to download the content file may be forwarded to a host user agent server 410. In some implementations, the HTTP server 406 and the host user agent server 410 are the same physical server device and the host user agent server 406 is a logical process running on the HTTP server 406.

The host user agent server 410 may establish a session with the media player/downloader device 401. The session may be, for example, a SIP session. A SIP proxy server 414 may be used to route the request to download the content file to a server which is closer to the media player/downloader device 401 than the host user agent server 410, such as a SIP edge server 416.

After a session with the media player/downloader device 401 is established, the host user agent server 410 (or the SIP edge server 416) may send a link related to the requested content file to the media player/downloader device 401. For example, a link to a BitTorrent™ torrent file associated with the requested content may be sent to the media player/downloader device 401. In response to receiving the link related to the requested content, the media player/downloader device 401 may, for example, use the link to download a torrent file 418 using HTTP over the Internet. The media player/downloader device 401 may use the torrent file 418 to download the requested content file, such as from one or more BitTorrent™ clients 420 included in one or more BitTorrent™ swarms 422.

Figure 5:
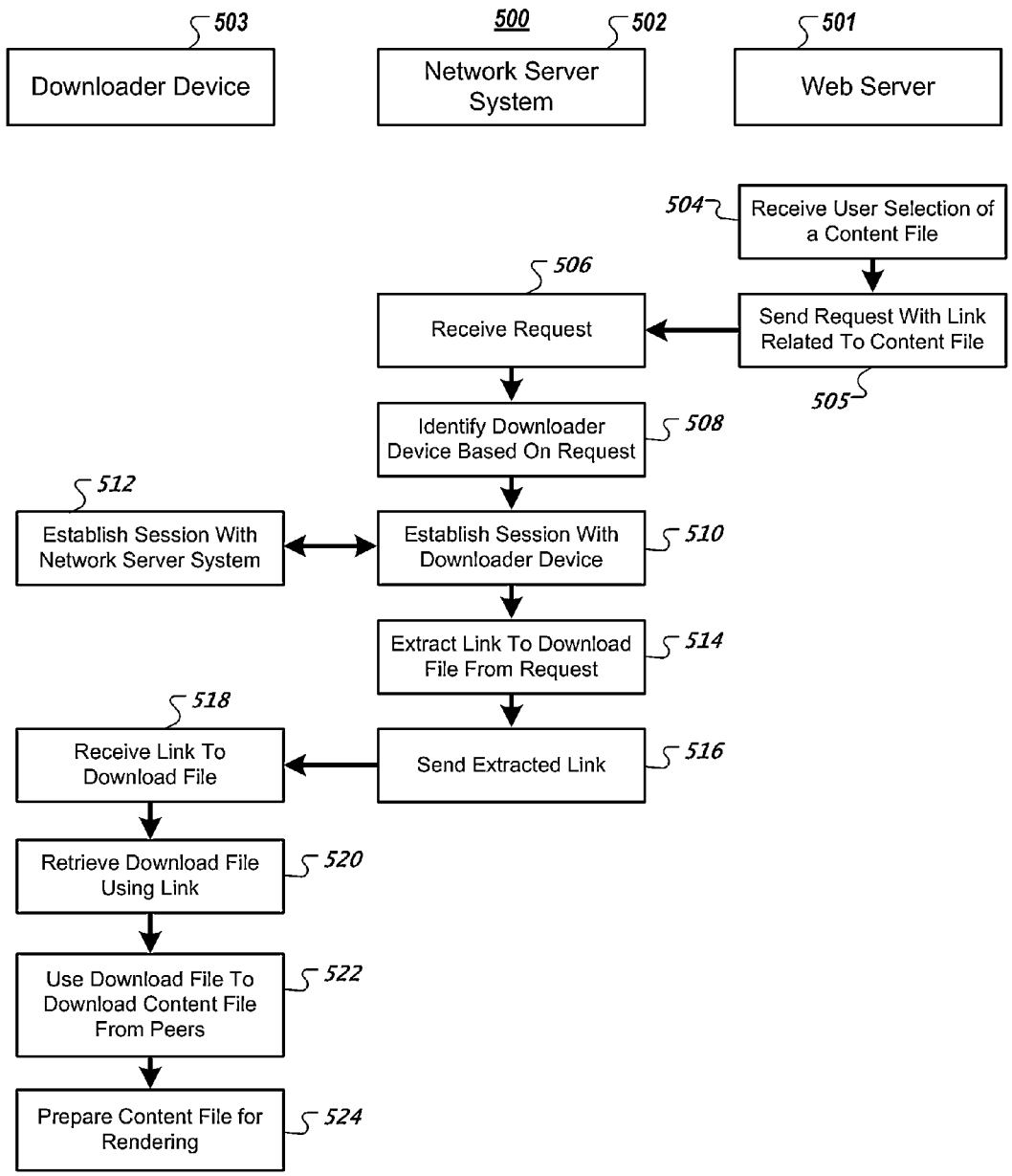

The system 400 is described in more detail below with respect to FIG. 5. FIG. 5 illustrates a process 500 for sending information for downloading a content file to a media player/downloader device. The operations of the process 500 are described generally as being performed by a web server 501, a network server system 502, and a media player/downloader device 503. The operations of the process 500 may be performed exclusively by the web server 501, the network server system 502, and the media player/downloader device 503, or the operations of the process 500 may be performed partly or entirely by another system or by a combination of other systems. In some implementations, operations of the process 500 may be performed by one or more processors included in one or more electronic devices.

The web server 501 receives user selection of a content file (504). For example, the user may select a content file using a search engine. For example, in reference to FIG. 4, to select a content file, the end user 402 may use the search engine 404 to select a link related to the content file in a directory or in a search results list displayed in the search engine 404, where the search engine 404 is served by a web server. The web server serving the search engine 404 may, for example, receive the user-selected link from a web browser used by the end user 402.

The web server 501 sends a request with a link related to the content file to the network server system (505). In some implementations, the user-selected link refers to the network server system 502. For example, in reference to FIG. 4, the user-selected link may refer to the HTTP server 406. For example, the search engine 404 may display an embedded user interface area (e.g., an inline frame, or "IFRAME") associated with the HTTP server 406. Links displayed in the embedded user interface area, such as the user-selected link, may refer to or may be associated with the HTTP server 406. In some implementations, the user-selected link includes a second link which relates to the requested content file. For example, the second link may be embedded in the user-selected link and may be a link to a BitTorrent™ file associated with the requested content file.

The network server system 502 receives the request (506). For example, in reference to FIG. 4, the HTTP server 406 may receive a request from the search engine 404. In some examples, the request is sent using HTTP. The request may include, for example, some or all of a user identifier, a device identifier, and a link related to the requested content file (e.g., a link to a download file, such as a BitTorrent™ torrent file).

The network server system 502 identifies a media player/downloader device based on the request (508). For example, the request received by the network server system 502 may include a user identifier, and the user identifier may be parsed from the request and mapped to a device identifier (e.g., using a table which maps user identifiers to device identifiers). For example, the user identifier may be mapped to a device identifier corresponding to the media player/downloader device 503. In the example of FIG. 4, the HTTP server 406 may map a user identifier included in a request received from the search engine 404 to a device identifier corresponding to the media player/downloader device 401.

As another example, the request received by the network server system 502 may include a device identifier for a particular media player/downloader device. The network server system 502 may parse the device identifier from the request and may identify, for example, the media player/downloader device 503 based on the parsed device identifier.

The network server system 502 establishes a session with the media player/downloader device 503 (510) and the media player/downloader device 503 establishes a session with the network server system 502 (512). For example, a SIP session may be established between the network server system 502 and the media player/downloader device 503. In the example of FIG. 4, a SIP session may be established between the host user agent server 410 and the media player/downloader device 401. In some examples, a session is also established between the media player/downloader device 401 and the SIP edge server 416.

The network server system 502 extracts a link to a download file from the request (514). For example, a link to a BitTorrent™ torrent file may be parsed and extracted from the request. The network server system 502 may validate the link (e.g., confirm that the link refers to an available file).

The network server system 502 sends the extracted link to the media player/downloader device 503 (516) and the media player/downloader device 503 receives the link to the download file (518). For example, the extracted link may be sent using a SIP media path over the established SIP session (e.g., using a UDP-based Data Transfer (UDT) connection). In the example of FIG. 4, the host user agent server 410 may send a link to a BitTorrent™ torrent file to the media player/downloader device 401.

The media player/downloader device 503 retrieves a download file using the link (520). For example, the media player/downloader device may use the link to the download file to retrieve a BitTorrent™ torrent file over the Internet, using HTTP. In the example of FIG. 4, the media player/downloader device 401 may download the torrent file 418.

The media player/downloader device 503 uses the download file to download the content file from peers (522). For example, a retrieved BitTorrent™ torrent file may be used to download the content file from one or more BitTorrent™ clients. In the example of FIG. 4, the media player/downloader device 401 may use a retrieved version of the BitTorrent™ torrent file 418 to download the content file from one or more BitTorrent™ clients 420 in one or more BitTorrent™ swarms 422. The one or more BitTorrent™ clients 420 may include other media player/downloader devices associated with the content delivery network 408.

The media player/downloader device 503 prepares the content file for rendering (524). For example, the content file may be transcoded, decrypted, and/or decompressed. In some implementations, some or all of a transcoded or otherwise preprocessed content file may be preloaded into a cache of a media player/downloader device.

Figure 6A:
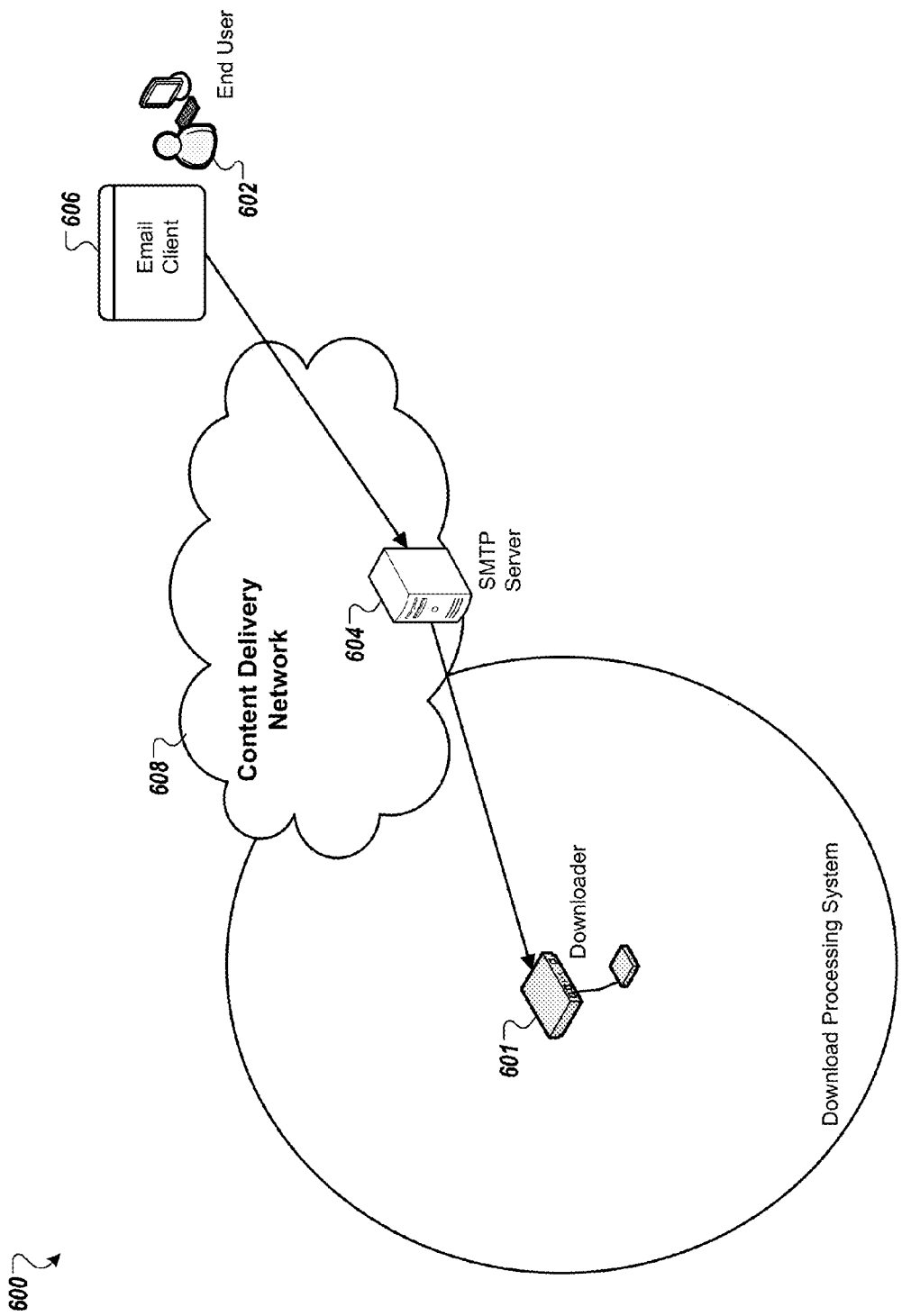

FIG. 6A illustrates an exemplary system 600 for downloading content to a media player/downloader device 601. In one example, an end user 602 may send an electronic communication to an SMTP (Simple Mail Transfer Protocol) server 604 using an e-mail client 606 over a content delivery network 608. In other examples, the end user 602 sends other forms of electronic communication to one or more communications servers. For example, the end user 602 may send an instant message, text message (SMS (Short Message Service) message), or a message sent with a messaging API (Application Programming Interface) provided by a social networking server (e.g., Facebook, Twitter).

The electronic communication may include a recipient address corresponding to the media player/downloader device 601. The electronic communication may also include a link related to the requested content file. For example, a link to the requested content file or a link to a BitTorrent™ torrent file associated with the requested content file may be included in the body or subject of the electronic communication. A process running on the SMTP server 604 processes the electronic communication and parses the recipient address from the electronic communication and extracts the link related to the content file. The content file may be part of a user's private collection and may or may not be torrentized.

A session (e.g., SIP session) may be established with the media player/downloader device 601. After a session with the media player/downloader device 601 is established, the link related to the requested content file is sent to the media player/downloader device 601. For example, a link to the requested content or a link to a BitTorrent™ torrent file associated with the requested content may be sent to the media player/downloader device 601. In response to receiving the link related to the requested content, the media player/downloader device 601 may, for example, use the link to download a torrent file and may use the torrent file to download the requested content file, such as from one or more BitTorrent™ clients. If the link is a link to the requested content file, the media player/downloader device 601 may download the requested content file using the link.

Figure 6B:
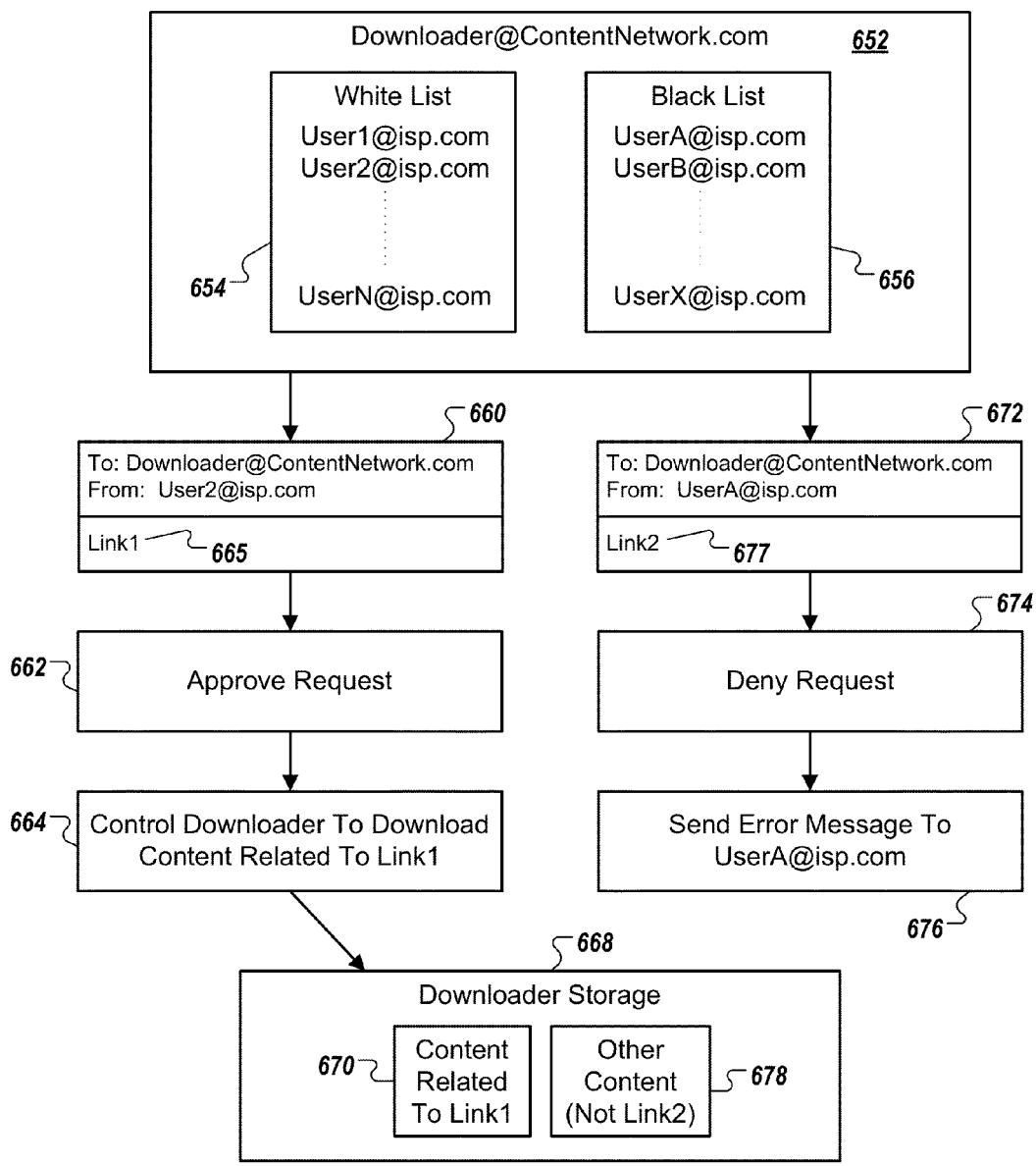
FIG. 6B is a diagram illustrating whitelist and blacklist processing.

The SMTP server 604 may perform whitelist and blacklist processing. For example, if the sender address is on a whitelist, the SMTP server 604 may approve the communication and if the sender address is on a blacklist, the SMTP server 604 may reject the communication. FIG. 6B illustrates whitelist and blacklist processing in further detail. A data record 652 for a particular media player/downloader device (e.g., a media player/downloader device associated with a recipient address of "Downloader@ContentNetwork.com") includes a whitelist 654 and a blacklist 656. In some implementations, a particular whitelist or a particular blacklist is stored in association with a particular media player/downloader device, and in other implementations whitelists and blacklists are associated with multiple media player/downloader devices. Whitelists and blacklists may be stored, for example, in data storage accessible by a communications server.

The whitelist 654 includes sender addresses (e.g., "User1@isp.com", "User2@isp.com", and "UserN@isp.com") which have been determined to be associated with trusted senders. The blacklist 656 includes sender addresses (e.g., "UserA@isp.com", "UserB@isp.com", and "UserX@isp.com") which have been determined to be associated with untrusted senders.

If a communications server (e.g., the SMTP server 604 of FIG. 6A) receives an electronic communication from a sender whose address is included in the whitelist 654, the communications server may approve the communication. For example, a communications server may receive an electronic communication 660, from a sender "User2@isp.com", where the "User2@isp.com" address is included in the whitelist 654. Based on the inclusion of the "User2@isp.com" address in the whitelist 654, the communications server may approve the associated request, as indicated by an action 662. As indicated by an action 664, the communications server may control a media player/downloader device to download content related to a link 665 included in the electronic communication. The link 665 may relate to a content file (e.g., the link 665 may be a link to a BitTorrent™ torrent file associated with a particular content file).

The media player/downloader device to control may be identified by the recipient address of the electronic communication 660 (e.g., "Downloader@ContentNetwork.com"). The media player/downloader device may download a download file using the link 665 and may use the download file to download a content file. The downloaded content file may be stored in media player/downloader storage 668 associated with the media player/downloader device, in a storage area 670 which includes content related to the link 665.

If a communications server receives an electronic communication from a sender whose address is included in the blacklist 656, the communications server may deny or reject the communication. For example, a communications server may receive an electronic communication 672, from a sender "UserA@isp.com", where the "UserA@isp.com" address is included in the blacklist 656. The communications server may deny the associated request, as indicated by an action 674. As indicated by an action 676, the communications server may send an error message to the "UserA@isp.com" address. The communications server may otherwise ignore the electronic communication 672. For example, the electronic communication 672 may include a link 677 related to a content file and may include a recipient address (e.g., "Downloader@ContentNetwork.com") associated with a particular media player/downloader device. The communications server may ignore (e.g., not process) the link 677. Furthermore, media player/downloader storage 668 associated with the media player/downloader device may be unaltered by the receipt of the electronic communication 672 (the media player/downloader storage 668 may include a storage area 678, which includes content unrelated to the links 677 and 665, which is unaffected by the receipt of the electronic communication 672).

Figure 7:
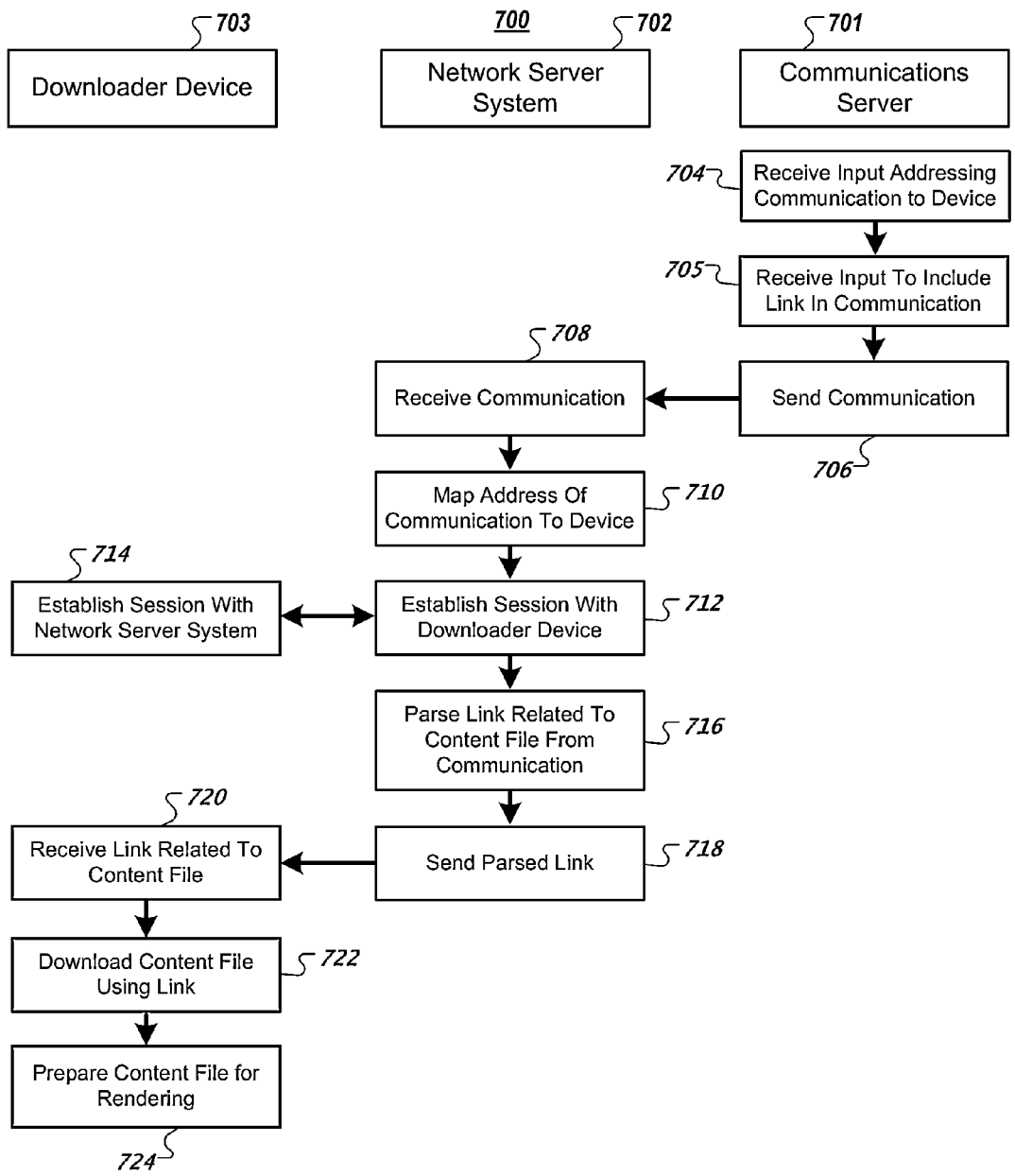

FIG. 7 illustrates a process 700 for sending information for downloading a content file to a media player/downloader device. The operations of the process 700 are described generally as being performed by a communications server 701, a network server system 702, and a media player/downloader device 703. The operations of the process 700 may be performed exclusively by the communications server 701, the network server system 702, and the media player/downloader device 703, or the operations of the process 700 may be performed partly or entirely by another system or by a combination of other systems. In some implementations, operations of the process 700 may be performed by one or more processors included in one or more electronic devices.

The communications server 701 receives an input addressing a communication to the media player/downloader device 703 (704). For example, the communications server 701 may receive input defining an email from a user which includes a recipient address corresponding to at least one media player/downloader device. For example, the recipient address may be an email address corresponding to the media player/downloader device 703.

Other examples may include the communications server 701 receiving input defining an instant message, text message (SMS (Short Message Service) message), or a message sent with a messaging API (Application Programming Interface) provided by a social networking server (e.g., Facebook, Twitter). In some examples, message processing of messages received from social networking sites may be integrated with email submission processing. For example, the communications server 701 may receive a message from a messaging API from a user of a social network and may initiate the sending of an email with a sender email address associated with the user and a recipient email address associated with a media player/downloader device corresponding to the user. As described in FIG. 6B, whitelist and/or blacklist processing may be used to approve or reject the communication.

The communications server 701 receives an input to include a link in the communication (705). For example, the subject or body of the defined communication may include a link to a file related to a content file, such as a link to a BitTorrent™ torrent file associated with a particular content file.

The communications server 701 sends the communication to the network server system 702 (706) and the network server system 702 receives the communication (708). For example, an SMTP server may forward an electronic communication to another server.

The network server system 702 maps the address of the communication to the media player/downloader device 703 (710). For example, the communication received by the network server system 702 may include a recipient address associated with a particular media player/downloader device, and the recipient address may be parsed from the communication and mapped to a media player/downloader device (e.g., using a table which maps email addresses to media player/downloader device identifiers). For example, the recipient address may be mapped to a device identifier corresponding to the media player/downloader device 703. In the example of FIG. 6A, the SMTP server 604 may map the recipient address included in an electronic communication received from the email client 606 to a device identifier corresponding to the media player/downloader device 601.

The network server system 702 establishes a session with the media player/downloader device 703 (712) and the media player/downloader device 703 establishes a session with the network server system 702 (714). For example, a SIP session may be established between the network server system 702 and the media player/downloader device 703. In the example of FIG. 6A, a SIP session may be established between a host user agent server (e.g., a host user agent server process running on the SMTP server 604 or running on another server machine) and the media player/downloader device 601.

The network server system 702 parses a link related to a content file from the communication (716). For example, a link to a BitTorrent™ torrent file associated with a content file may be parsed and extracted from the subject or the body of the communication. The network server system 702 may validate the link (e.g., confirm that the link refers to an available file).

The network server system 702 sends the parsed link to the media player/downloader device 703 (718) and the media player/downloader device 703 receives the link related to the content file (720). For example, the extracted link may be sent from a host user agent server to the media player/downloader device 703 using a SIP media path over the established SIP session (e.g., using a UDT connection).

The media player/downloader device 703 downloads the content file using the link (722). For example, the media player/downloader device may use the link to retrieve a BitTorrent™ torrent file over the Internet, using HTTP. The torrent file may be used to download a content file. For example, a retrieved BitTorrent™ torrent file may be used to download the content file from one or more BitTorrent™ clients.

The media player/downloader device 703 prepares the content file for rendering (724). For example, the content file may be transcoded, decrypted, and/or decompressed. In some implementations, some or all of a transcoded or otherwise preprocessed content file may be preloaded into a cache of a media player/downloader device.

Figure 8:
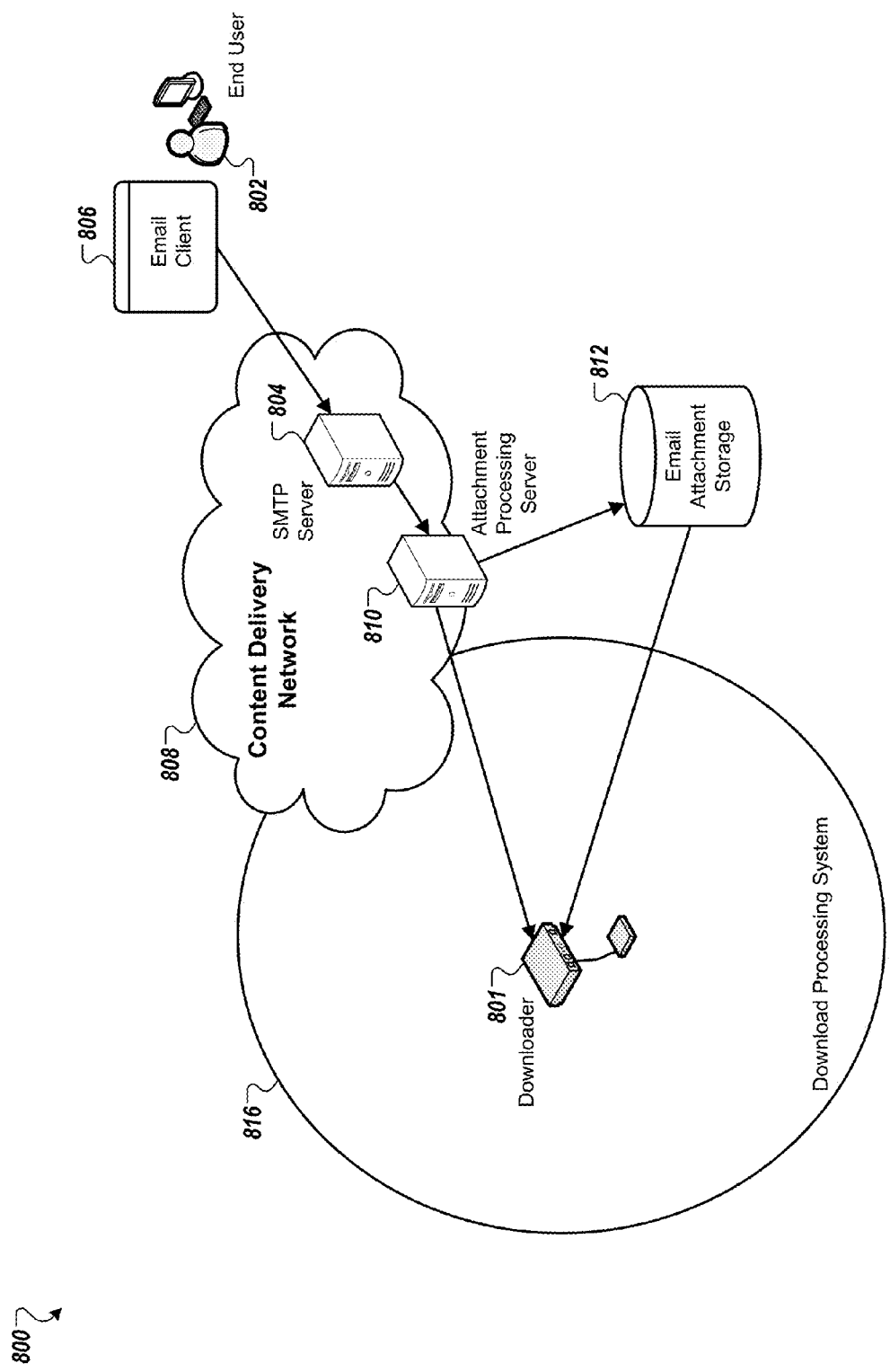

FIG. 8 illustrates an exemplary system 800 for downloading content to a media player/downloader device 801. In one example, an end user 802 may send an electronic communication to an SMTP server 804 using an e-mail client 806 over a content delivery network 808. The electronic communication may include a recipient address corresponding to the media player/downloader device 801. As described in FIG. 6B, whitelist and/or blacklist processing may be used to approve or reject the communication.

The electronic communication may also include an attachment which includes a content file to be downloaded to the media player/downloader device 801. The subject or body of the electronic communication may indicate whether the attached file is a public or private content file. A public file may be, for example, a file generally available to the public, such as a file available using a public BitTorrent™ tracker, or otherwise publicly available on the Internet or another public source. A private file is a file which is available to a single user or a group of users, such as by using a private BitTorrent™tracker.

The SMTP server 804 may extract the attached file from the communication and may forward the attached file to an attachment processing server 810. The attachment processing server 810 may determine whether the attachment exists in an email attachment storage 812. If the attachment does not exist in the email attachment storage 812, the attachment processing server 810 may create download information (e.g., a BitTorrent™ torrent file, a link to the attached file) associated with the attachment and may store the attached file and the download information in the email attachment storage 812. In some implementations, the attachment processing server 810 torrentizes the attached file and creates a private tracker to limit the distribution of the torrentized version of the attached file to authorized users. The attachment processing server 810 also may retain the attached file itself without torrentizing the file. If the attachment already exists in the email attachment storage 812, the attachment processing server 810 may retrieve previously-created download information for the attached file.

A session (e.g., SIP session) may be established with the media player/downloader device 801. After a session with the media player/downloader device 801 is established, the download information is sent to the media player/downloader device 801. For example, a link to a BitTorrent™ torrent file associated with the attached file may be sent to the media player/downloader device 801. In another example, a torrent file associated with the attached file may be sent to the media player/downloader device 801. If the download information is a link to a torrent file, the media player/downloader device 801 may download the torrent file. The media player/downloader device 801 may use the torrent file (e.g., either a downloaded or received torrent file) to download the attached file. For example, the attachment processing server 810 may act as a BitTorrent™ client and the attached file may be retrieved from the email attachment storage 812. In some implementations, the attachment processing server 810 sends the attached file directly to the media player downloader device 801. In other implementations, the media player/downloader device 801 downloads the attached file from the attachment processing server 810.

Figure 9:
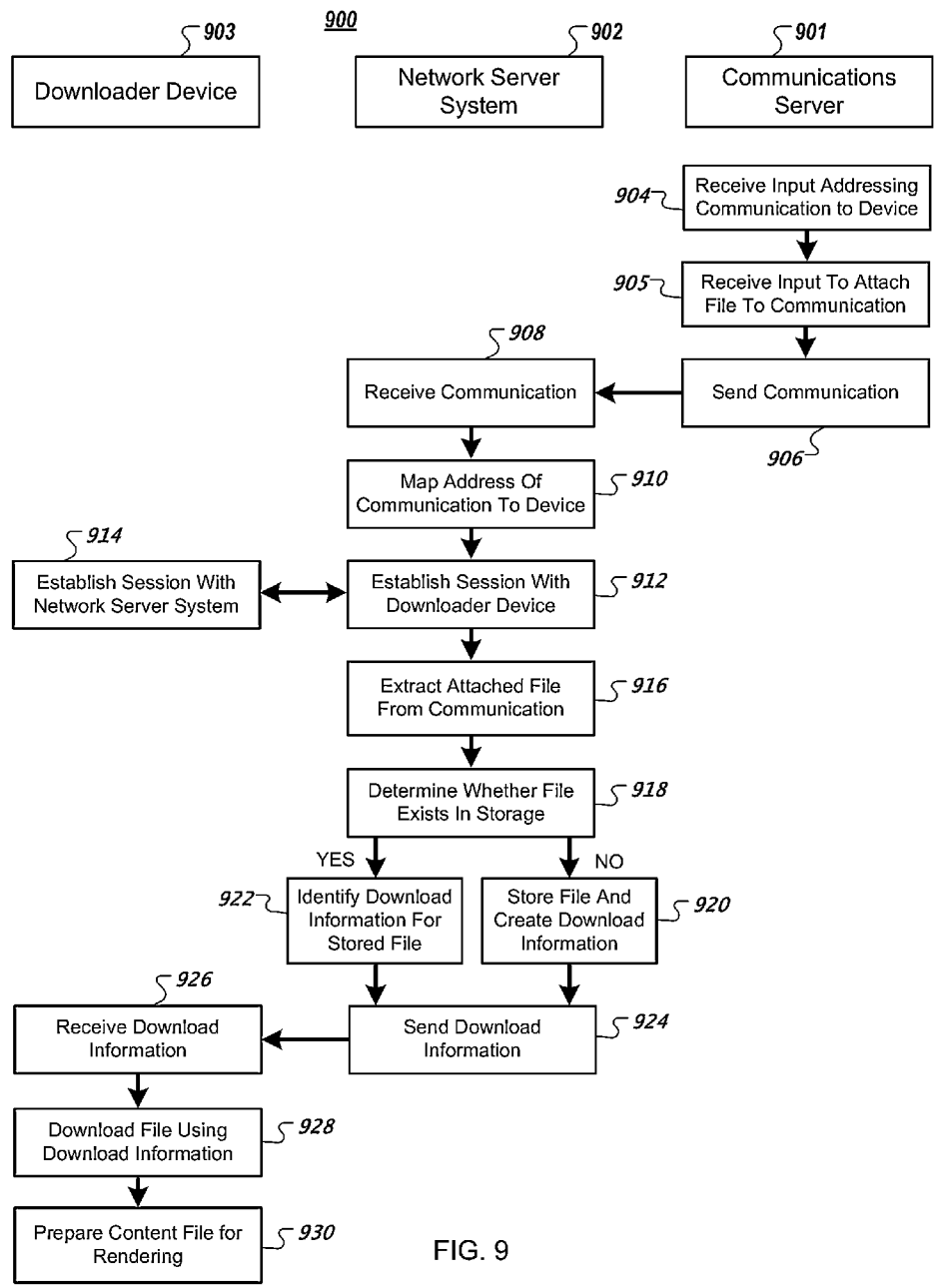

FIG. 9 illustrates a process 900 for downloading content to a media player/downloader device. The operations of the process 900 are described generally as being performed by a communications server 901, a network server system 902, and a media player/downloader device 903. The operations of the process 900 may be performed exclusively by the communications server 901, the network server system 902, and the media player/downloader device 903, or the operations of the process 900 may be performed partly or entirely by another system or by a combination of other systems. In some implementations, operations of the process 900 may be performed by one or more processors included in one or more electronic devices.

The communications server 901 receives input addressing a communication to the media player/downloader device 903 (904). For example, the communications server 901 may receive input defining an email from a user which includes a recipient address corresponding to at least one media player/downloader device. For example, the recipient address may be an email address corresponding to the media player/downloader device 903. In the example of FIG. 8, the SMTP server 804 may receive an email communication sent using the email client 806, where the recipient address of the email communication corresponds to the media player/downloader device 801. As described in FIG. 6B, whitelist and/or blacklist processing may be used to approve or reject the communication.

The communications server 901 receives an input to attach a file to the communication (905). For example, the user may attach a content file to an email communication. In the example of FIG. 8, the end user 802 may attach a file to an email communication using the email client 806.

The communications server 901 sends the communication to the network server system 902 (906) and the network server system 902 receives the communication (908). For example, an SMTP server may forward an electronic communication to another server. In the example of FIG. 8, the SMTP server 804 may forward the communication to the attachment processing server 810.

The network server system 902 maps the address of the communication to the media player/downloader device 903 (910). For example, the communication received by the network server system 902 may include a recipient address associated with a particular media player/downloader device, and the recipient address may be parsed from the communication and mapped to a media player/downloader device (e.g., using a table which maps email addresses to media player/downloader device identifiers). For example, the recipient address may be mapped to a device identifier corresponding to the media player/downloader device 903. In the example of FIG. 8, the attachment processing server 810 may map the recipient address included in an electronic communication received from the email client 806 to a device identifier corresponding to the media player/downloader device 801.

The network server system 902 establishes a session with the media player/downloader device 903 (912) and the media player/downloader device 903 establishes a session with the network server system 902 (914). For example, a SIP session may be established between the network server system 902 and the media player/downloader device 903. In the example of FIG. 8, a SIP session may be established between a host user agent server (e.g., a host user agent server process running on the attachment processing server 810 or running on another server machine) and the media player/downloader device 801.

The network server system 902 extracts an attached file from the communication (916). For example, the network server system 902 may extract an attached file from an email communication and may store the attached file in memory or other electronic storage.

The network server system 902 determines whether the attachment file exists in storage (918). For example, the network server system 902 may create a digital signature of the attachment file and may compare the digital signature of the attachment file to digital signatures associated with previously-stored attachment files stored in an email attachment storage.

If the attachment file does not exist in storage, the network server system 902 stores the attachment file and creates download information (920). For example, the network server system 902 may create download information such as a BitTorrent™ torrent file associated with the attachment file and may store the attachment file and the download information in an email attachment storage.

If the attachment file exists in storage, the network server system 902 identifies download information for the stored attachment file (922). For example, the network server system 902 may identify and retrieve a stored BitTorrent™ torrent file associated with the stored attachment file.

The network server system 902 sends download information to the media player/downloader device 903 (924) and the media player/downloader device 903 receives the download information (926). For example, the download information may be sent from a host user agent server to the media player/downloader device 903 using a SIP media path over the established SIP session (e.g., using a UDT connection). The download information may be a torrent file or may be a link to a torrent file.

The media player/downloader device 903 downloads the file using the download information (928). If the download information is a link to a torrent file, the media player/downloader device 903 may download the torrent file. The media player/downloader device 903 may use a torrent file (e.g., either a downloaded or received torrent file) to download the attached file. For example, the network server system 902 may act as a BitTorrent™ client and the attached file may be retrieved from an email attachment storage.

The media player/downloader device 903 prepares the content file for rendering (930). For example, the content file may be transcoded, decrypted, and/or decompressed. In some implementations, some or all of a transcoded or otherwise preprocessed content file may be preloaded into a cache of a media player/downloader device.

Figure 10:
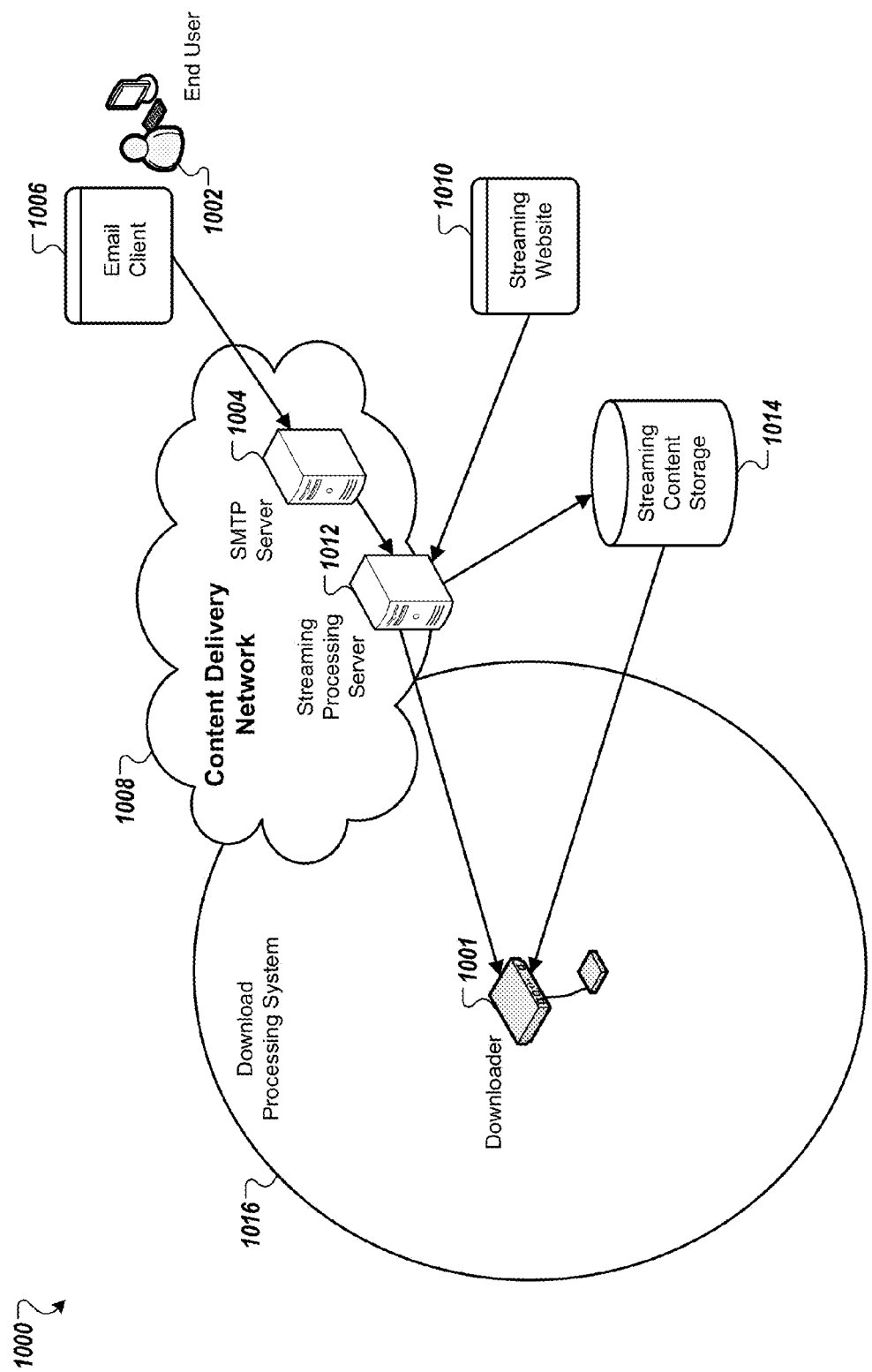

FIG. 10 illustrates an exemplary system 1000 for downloading streaming content to a media player/downloader device 1001. In one example, an end user 1002 may send an electronic communication to an SMTP server 1004 using an e-mail client 1006 over a content delivery network 1008. In other examples, the end user 1002 sends other forms of electronic communication to one or more communications servers. For example, the end user 1002 may send an instant message, text message (SMS (Short Message Service) message), or a message sent with a messaging API (Application Programming Interface) provided by a social networking server (e.g., Facebook, Twitter). As described in FIG. 6B, whitelist and/or blacklist processing may be used to approve or reject the communication.

The electronic communication may include a recipient address corresponding to the media player/downloader device 1001. The electronic communication may also include a link to streaming content, such as a link to streaming content hosted by a streaming website 1010. The link to streaming content may be included in the body or subject of the electronic communication. A process running on the SMTP server 1004 processes the electronic communication and parses the recipient address from the electronic communication and extracts the link related to the content file. The SMTP server 1004 may forward the link to streaming content to a streaming processing server 1012.

The streaming processing server 1012 may determine whether the streaming content associated with the link already exists in streaming content storage 1014. If the streaming content exists in the streaming content storage 1014, the streaming processing server 1012 identifies and retrieves download information (e.g., a BitTorrent™ torrent file) for the streaming content. If the streaming content does not exist in the streaming content storage 1014, the streaming processing server 1012 retrieves the streaming content from the streaming website 1010, converts the streaming content into an independent downloadable and playable file, stores the independent downloadable and playable file in the streaming content storage 1014, creates download information (e.g., a BitTorrent™ torrent file) for the downloadable and playable file, and stores the download information (e.g., in the streaming content storage 1014).

A session (e.g., SIP session) may be established with the media player/downloader device 1001. After a session with the media player/downloader device 1001 is established, the download information for the streaming content is sent to the media player/downloader device 1001. For example, a link to a BitTorrent™ torrent file associated with the streaming content may be sent to the media player/downloader device 1001. In response to receiving the link related to the streaming content, the media player/downloader device 1001 may, for example, use the link to download a torrent file using HTTP over the Internet.

Figure 11:
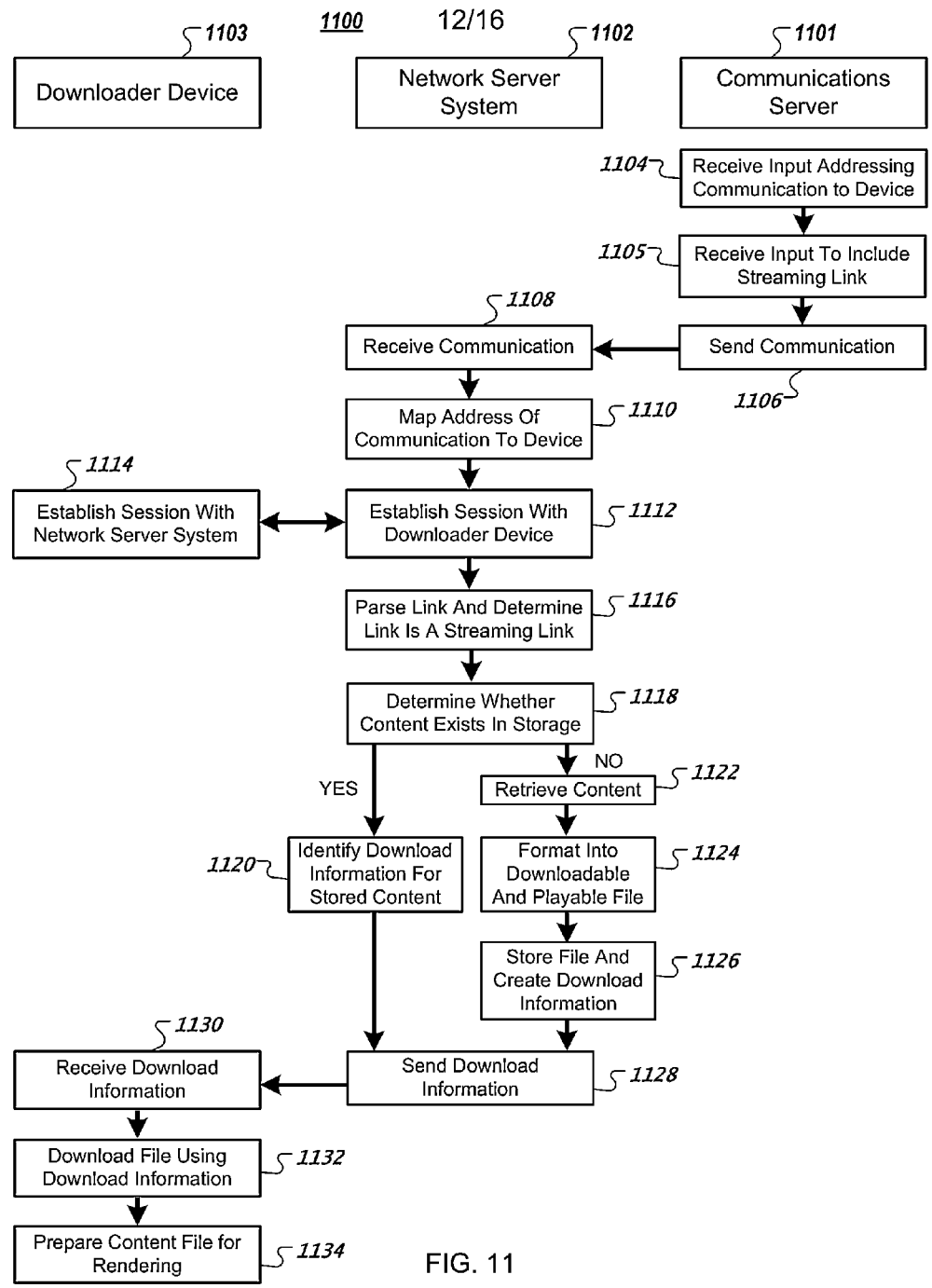

FIG. 11 illustrates a process 1100 for downloading streaming content to a media player/downloader device. The operations of the process 1100 are described generally as being performed by a communications server 1101, a network server system 1102, and a media player/downloader device 1103. The operations of the process 1100 may be performed exclusively by the communications server 1101, the network server system 1102, and the media player/downloader device 1103, or the operations of the process 1100 may be performed partly or entirely by another system or by a combination of other systems. In some implementations, operations of the process 1100 may be performed by one or more processors included in one or more electronic devices.

The communications server 1101 receives an input addressing communication to the media player/downloader device 1103 (1104). For example, the communications server 1101 may receive input defining an email from a user which includes a recipient address corresponding to at least one media player/downloader device. For example, the recipient address may be an email address corresponding to the media player/downloader device 1103. As described in FIG. 6B, whitelist and/or blacklist processing may be used to approve or reject the communication.

Other examples may include the communications server 1101 receiving input defining an instant message, text message (SMS (Short Message Service) message), or a message sent with a messaging API (Application Programming Interface) provided by a social networking server (e.g., Facebook, Twitter). In some examples, message processing of messages received from social networking sites may be integrated with email submission processing. For example, the communications server 1101 may receive a message from a messaging API from a user of a social network and may initiate the sending of an email with a sender email address associated with the user and a recipient email address associated with a media player/downloader device corresponding to the user.

The communications server 1101 receives an input to include a streaming link (1104). For example, the subject or body of the received communication may include a link to streaming content, such as streaming content hosted by a streaming website (e.g., YouTube).

The communications server 1101 sends a communication to the network server system 1102 (1106) and the network server 1102 system receives the communication (1108). For example, an SMTP server may forward an electronic communication to another server. In the example of FIG. 10, the email sent from the email client 1006 may be forwarded from the SMTP server 1004 to the streaming processing server 1012.

The network server 1102 system maps the address of the communication to the media player/downloader device 1103 (1110). For example, the communication received by the network server system 1102 may include a recipient address associated with a particular media player/downloader device, and the recipient address may be parsed from the communication and mapped to a media player/downloader device (e.g., using a table which maps email addresses to media player/downloader device identifiers). For example, the recipient address may be mapped to a device identifier corresponding to the media player/downloader device 1103. In the example of FIG. 10, the SMTP server 1004 or the streaming processing server 1012 may map the recipient address included in an electronic communication received from the email client 1006 to a device identifier corresponding to the media player/downloader device 1001.

The network server system 1102 establishes a session with the media player/downloader device 1103 (1112) and the media player/downloader device 1103 establishes a session with the network server system 1102 (1114). For example, a SIP session may be established between the network server system 1102 and the media player/downloader device 1103. In the example of FIG. 10, a SIP session may be established between a host user agent server (e.g., a host user agent server process running on the streaming processing server 1012 or running on another server machine) and the media player/downloader device 1001.

The network server 1102 system parses a link and determines that the link is a streaming link (1116). For example, a link may be parsed and extracted from the subject or the body of the communication. The network server system 1102 may determine that the link is a streaming link based, for example, on determining that the server portion of the link corresponds to a server associated with a streaming website. As another example, the network server system 1102 may determine that the link is a streaming link based on a determined file type associated with the link. The network server system 1102 may validate the link (e.g., confirm that the link refers to available streaming content).

The network server system 1102 determines whether the content exists in storage (1118). For example, the network server system 1102 may query to see if content associated with the link has been previously stored in streaming content storage (e.g., by querying to see if the link, a file name associated with the link, or other information corresponding to the link exists in storage). In the example of FIG. 10, the streaming processing server 1012 may determine if previously stored content for the received link to streaming content exists in the streaming content storage 1014. In some implementations, to determine whether streaming content exists in storage, the network server system 1102 retrieves the content and does a compare or query to determine if identical content already exists in storage.

If the content exists in storage, the network server system 1102 identifies download information for the stored content (1120). For example, a streaming processing server may identify and retrieve a previously-created BitTorrent™ torrent file associated with the streaming content. If the network server system 1102 had retrieved the streaming content to determine whether the streaming content already existed in storage, the network server system 1102 may discard the retrieved content.

If the content does not exist in storage, the network server system 1102 retrieves the content (1122). For example, streaming content may be retrieved from a streaming website using the streaming link. In the example of FIG. 10, the streaming processing server 1012 may use the streaming link to retrieve streaming content from the streaming website 1010.

The network server system 1102 formats the content into a downloadable and playable file (1124). For instance, in the example of FIG. 10, the streaming processing server 1012 may save streaming content received from the streaming website 1010 in a downloadable and playable streaming content file and may process the file (e.g., transcode the file) so that the file may be playable in a media player/downloader device.

The network server system 1102 stores the file and creates download information (1126). For example, the network server system 1102 may create download information such as a BitTorrent™ torrent file associated with the downloadable and playable streaming content file and may store the downloadable and playable streaming content file and the download information in streaming content storage. In the example of FIG. 10, the downloadable and playable streaming content file and the download information may be stored in the streaming content storage 1014.

The network server system 1102 sends download information to the media player/downloader device 1103 (1128) and the media player/downloader device 1103 receives the download information (1130). For example, the download information may be sent from a host user agent server to the media player/downloader device 1103 using a SIP media path over the established SIP session (e.g., using a UDT connection). The download information may be a torrent file or may be a link to a torrent file.

The media player/downloader device 1103 downloads the content file using the download information (1132). If the download information is a link to a torrent file, the media player/downloader device 1103 may download the torrent file. The media player/downloader device 1103 may use a torrent file (e.g., either a downloaded or received torrent file) to download the downloadable and playable streaming content file. For example, the network server system 1102 may act as a BitTorrent™ client and the attached file may be retrieved from streaming content storage.

The media player/downloader device 1103 prepares the content file for rendering (1134). For example, the streaming content file may be transcoded, decrypted, and/or decompressed. In some implementations, some or all of a transcoded or otherwise preprocessed streaming content file may be preloaded into a cache of a media player/downloader device.

Figure 12:
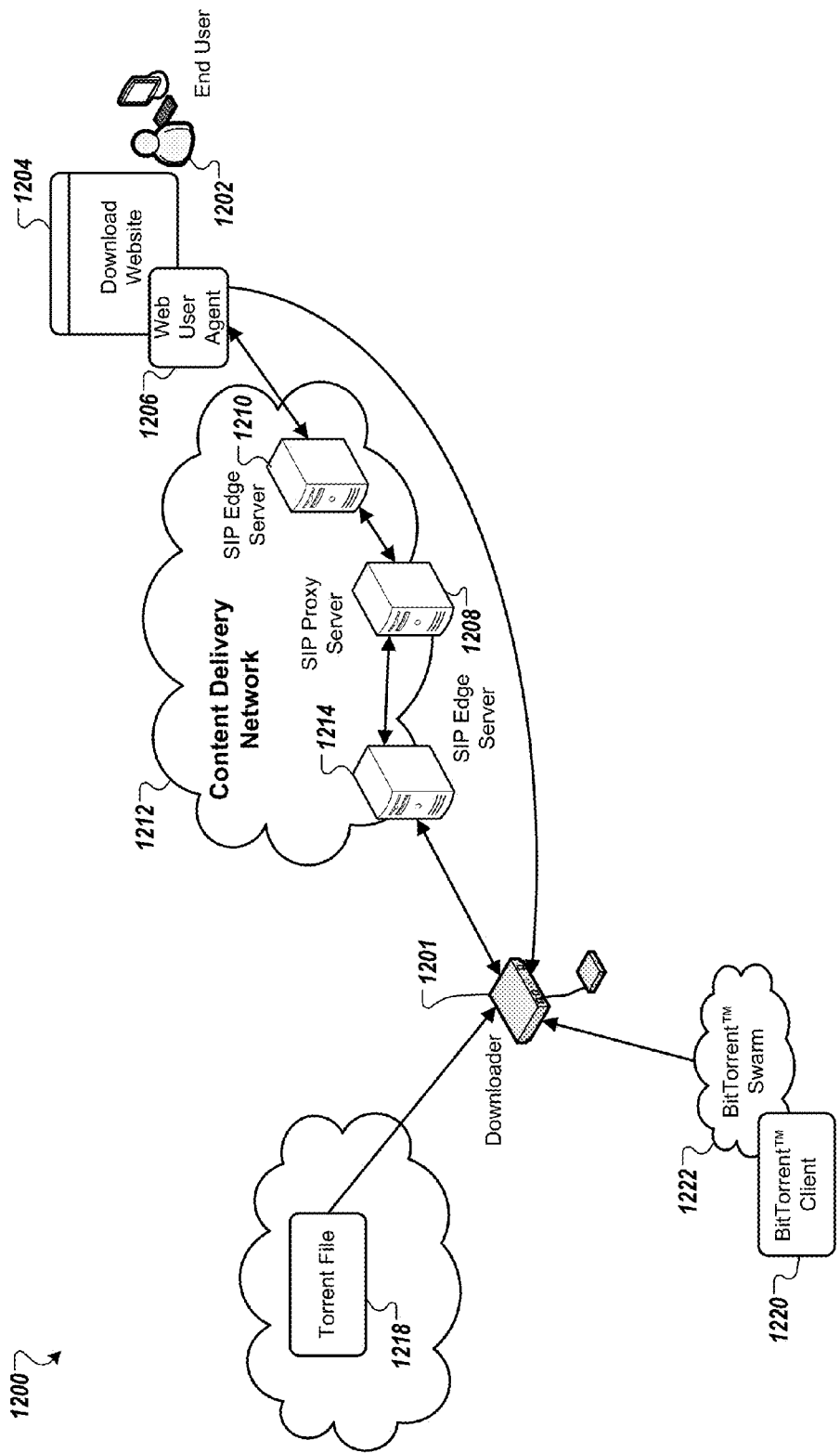

FIG. 12 illustrates an exemplary system 1200 for downloading content to a media player/downloader device 1201. An end user 1202 may use a download website 1204 to search for content. The download website 1204 may allow the end user 1202 to browse and search a content directory. To select a content file for download, the user may, for example, select a link in the directory or in a search results list. Prior to using the download website 1204, the end user may log in to the download website 1204. In response to a user selecting a link on the download website 1204, a web user agent 1206 (e.g., an agent process running in a web browser of the end user 1202) may establish a session with the media player/downloader device 1201. The session may be, for example, a SIP session.

After a session with the media player/downloader device 1201 is established, the web user agent 1206 may send a link related to the requested content file to the media player/downloader device 1201. For example, a link to a BitTorrent™ torrent file associated with the requested content may be sent to the media player/downloader device 1201. In some implementations, a SIP proxy server 1208 and a SIP edge server 1210 may be used to route the communication including the link, over a content delivery network 1212, to a server which is proximate to the media player/downloader device 1201, such as a second SIP edge server 1214.

In response to receiving the link related to the requested content, the media player/downloader device 1201 may, for example, use the link to download a torrent file 1218 using HTTP over the Internet. The media player/downloader device 1201 may use the torrent file 1218 to download the requested content file, such as from one or more BitTorrent™ clients 1220 included in one or more BitTorrent™ swarms 1222.

Figure 13:
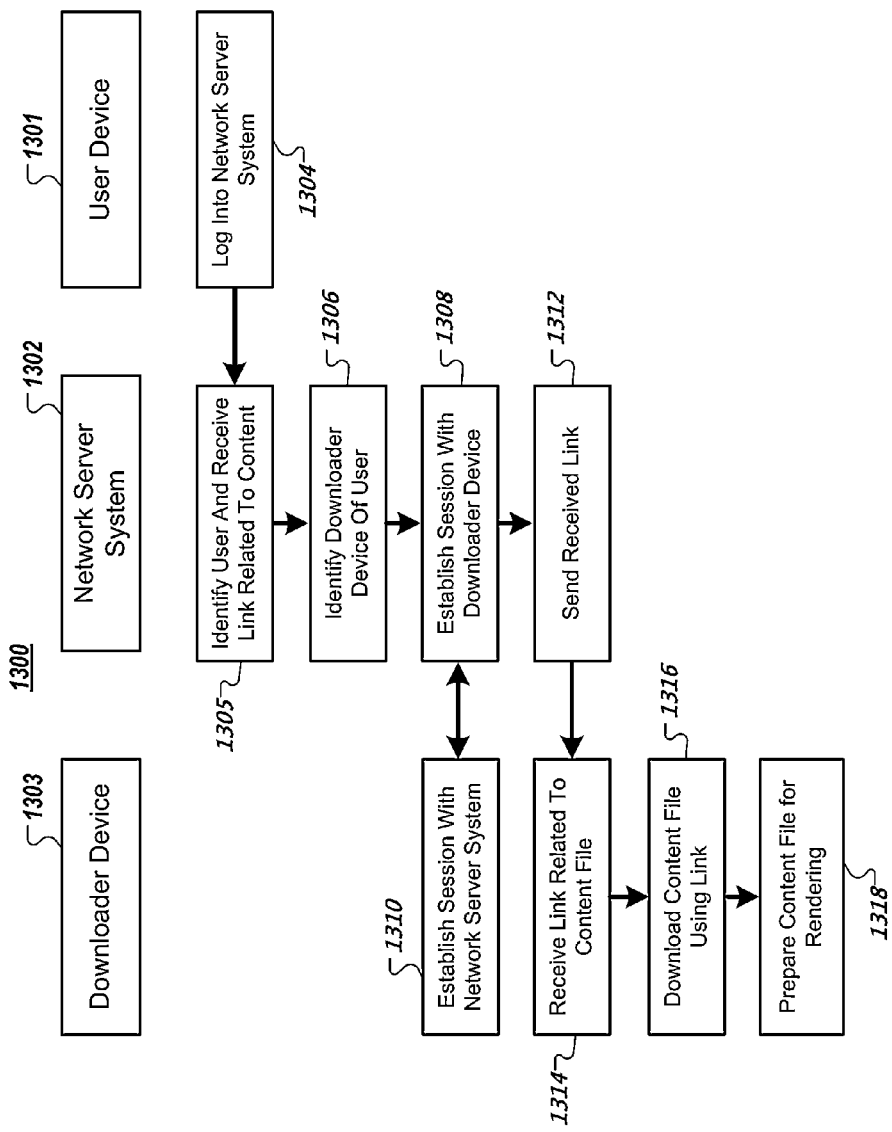

FIG. 13 illustrates a process 1300 for downloading a content file to a media player/downloader device. The operations of the process 1300 are described generally as being performed by a user device 1301, a network server system 1302, and a media player/downloader device 1303. The operations of the process 1300 may be performed exclusively by the user device 1301, the network server system 1302, and the media player/downloader device 1303, or the operations of the process 1300 may be performed partly or entirely by another system or by a combination of other systems. In some implementations, operations of the process 1300 may be performed by one or more processors included in one or more electronic devices.

The user device 1301 logs into the network server system 1302 (1304). For example, an end user may enter login information on a download website and a web user agent process running in the end user's web browser may accept the login information.

The network server system 1302 identifies the user and receives a link related to content (1305). For example, a web user agent may authenticate the user using the login information and may identify a user based on the login information. The web user agent may receive a link that is selected by a user using a download website and that relates to a content file.

The network server system 1302 identifies the media player/downloader device 1303 of the user (1306). For example, a user identifier entered by the user may be mapped to a device identifier (e.g., using a table which maps user identifiers to device identifiers). For example, the user identifier may be mapped to a device identifier corresponding to the media player/downloader device 1303.

The network server system 1302 establishes a session with the media player/downloader device 1303 (1308) and the media player/downloader device 1303 establishes a session with the network server system 1302 (1310). For example, a SIP session may be established between the network server system 1302 and the media player/downloader device 1303. In the example of FIG. 12, a SIP session may be established between the web user agent 1206 and the media player/downloader device 1201.

The network server system 1302 sends the received link to the media player/downloader device 1303 (1312) and the media player/downloader device 1303 receives a link related to a content file (1314). For example, the link may be sent using a SIP media path over the established SIP session (e.g., using a UDP (User Datagram Protocol)-based data transfer (UDT) connection). In the example of FIG. 12, the web user agent 1206 may send a link to a BitTorrent™ torrent file to the media player/downloader device 1201.

The media player/downloader device 1303 downloads the content file using the link (1316). For example, the media player/downloader device may use the link related to the content file to retrieve a BitTorrent™ torrent file over the Internet, using HTTP. The media player/downloader device 1303 may use the torrent file to download the content file from one or more BitTorrent™ clients (e.g., the BitTorrent™ client 1220 or another client included in the BitTorrent™ swarm 1222).

The media player/downloader device 1303 prepares the content file for rendering (1318). For example, the content file may be transcoded, decrypted, and/or decompressed. In some implementations, some or all of a transcoded or otherwise preprocessed content file may be preloaded into a cache of a media player/downloader device.

FIG. 14 illustrates a process 1400 for downloading content. The operations of the process 1400 are described generally as being performed by the system 200. The operations of the process 1400 may be performed by one of the components of the system 200 (e.g., the server system 210) or may be performed by a combination of the components of the system 200. In some implementations, operations of the process 1400 may be performed by one or more processors included in one or more electronic devices.

In response to a received request, the system 200 identifies attribute(s) of a user and/or device from which the request was received (1402). For example, the system 200 may identify a sender address, and a whitelist and/or blacklist associated with the user or device. As another example, the system 200 may identify a content rating which indicates the highest rating of content a user or device is allowed to download.

The system 200 performs an authentication process using the identified attribute(s) (1404). For example, the system 200 may determine whether the user and/or the device is eligible to control the media player/downloader device to download files by performing at least one of whitelisting and blacklisting (e.g., see FIG. 6B). As another example, the system 200 may determine that the user and/or the device is eligible to download a subset of available content to the media player/downloader device based on a type of the available content. As a further example, the system 200 may determine whether the user and/or the device is eligible to download content to the media player/downloader device using a password, a machine token, a certificate, or any other type of authentication.

For example, content may be rated and the user and/or device may be eligible to download content at or below a particular rating. The system 200 may determine a type of the content file associated with the received request and compare the type of the content file associated with the received request to the type of available content the user and/or the device is eligible to download.

The system 200 determines whether or not to process the request based on results of the authentication process (1406). For example, if a sender address associated with the request is included in a whitelist, the system 200 may determine to process the request. As another example, if a sender address associated with the request is included in a blacklist, the system 200 may determine to not process the request.

As another example, the system 200 may determine whether or not to process the request based on a comparison of a type of content file associated with the received request to the type of available content the user and/or device is eligible to download. For example, if the type of content associated with the request is "R" rated movie content and if the type of content the user is available to download is "PG-13" or below rated content, the system 200 may determine to not process the request. As another example, if the type of content associated with the request is "R" rated movie content and if the device is eligible to download content of any rating, the system 200 may determine to process the request.

In response to a determination to process the request, the system 200 controls a media player/downloader device to download a content file associated with request (1408). For example, the system 200 may send a link to a BitTorrent™ torrent file associated with the content file to a media player/downloader device. The media player/downloader device may use the link to download the torrent file and may use the torrent file to download the content file.

In response to a determination to not process the request, the system 200 ignores the request and sends an error message (1410). For example, the system 200 may send an error message to the user. An error message may be sent using email, text message, or instant message, to name a few examples. The message may be sent to a recipient address associated with the user and/or associated with the request.

As another example of downloading content, in some implementations, a first user may subscribe to a channel associated with a second user. For example, the second user may send a content item or a link to a content item to the first user, such as by sending an electronic communication (e.g., email) addressed to a communications address associated with the media player/downloader device of the first user. In response to receiving an electronic communication from the second user, the media player/downloader device of the first user (or, as other examples, a server device, or a remote control device associated with the first user) may extract the content from the communication (e.g., by downloading content through a link included in the communication, extracting content attached to the communication, or downloading content using download information (e.g., a BitTorrent™ torrent file) included in the communication, to name a few examples).

After content has been extracted, the content may be organized in a channel associated with the second user. The first user may watch the content items received from the second user, in a manner similar to watching content files included on a channel defined by a content curator. In some implementations, the second user in this example is a content curator. In other implementations, the second user is not a defined content curator, but is a regular user who has subscribed to the system. For example, the first user and second user may be friends or may belong to the same family. For example, a first user sending content to a second user with the received content being organized into a channel for the second user may be a convenient way for the second user to share content with the first user and possibly with other users (e.g., the second user may send electronic communication to a group of users).

Figure 15:
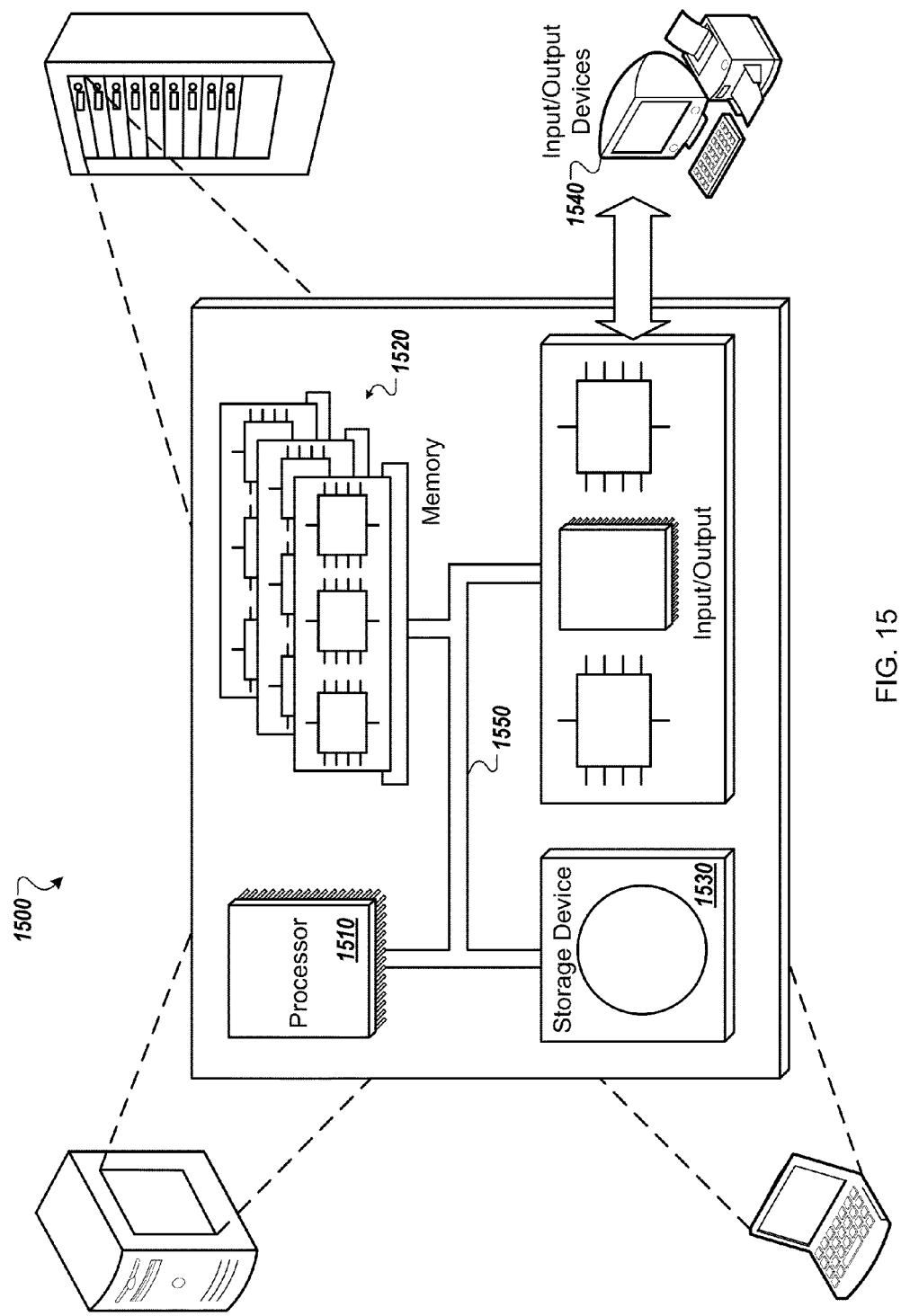

FIG. 15 is a schematic diagram of an example of a generic computer system 1500. The system 1500 can be used for the operations described in association with the processes 300, 500, 700, 900, 1100, 1300, and 1400, according to one implementation. For example, the system 1500 may be included in either or all of the server system 210, the server 208, the remote user device 212, the edge server 416, the SIP proxy server 414, the host user agent server 410, and the HTTP server 406.

The system 1500 includes a processor 1510, a memory 1520, a storage device 1530, and an input/output device 1540. Each of the components 1510, 1520, 1530, and 1540 are interconnected using a system bus 1550. The processor 1510 is capable of processing instructions for execution within the system 1500. In one implementation, the processor 1510 is a single-threaded processor. In another implementation, the processor 1510 is a multi-threaded processor. The processor 1510 is capable of processing instructions stored in the memory 1520 or on the storage device 1530 to display graphical information for a user interface on the input/output device 1540.

The memory 1520 stores information within the system 1500. In one implementation, the memory 1520 is a computer-readable medium. In one implementation, the memory 1520 is a volatile memory unit. In another implementation, the memory 1520 is a non-volatile memory unit.

The storage device 1530 is capable of providing mass storage for the system 1500. In one implementation, the storage device 1530 is a computer-readable medium. In various different implementations, the storage device 1530 may be a floppy disk device, a hard disk device, an optical disk device, or a tape device.

The input/output device 1540 provides input/output operations for the system 1500. In one implementation, the input/output device 1540 includes a keyboard and/or pointing device. In another implementation, the input/output device 1540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method of controlling a media device, the method comprising:
    receiving, at a network server system and from a remote device, a request to make a content file available to a media device that is different than the remote device, the request including identification information sufficient to enable the network server system to identify the media device;
    based on the identification information, identifying, by the network server system and from among multiple, different media devices, the media device associated with the received request;
    determining, by the network server system and based on the received request, address information for the content file associated with the received request;
    establishing, by the network server system, a communication session with the media device based on the identification of the media device associated with the received request; and
    sending the determined address information for the content file associated with the received request to the media device over the established communication session, thereby making the content file associated with the request available to the media device;
    wherein receiving, at the network server system and from the remote device, the request to make the content file available to the media device that is different than the remote device comprises receiving an electronic communication having a recipient address that corresponds to at least one of the multiple, different media devices and including a link to streaming content;
    wherein identifying the media device associated with the received request comprises mapping the recipient address of the received electronic communication to the media device; and
    wherein determining address information for the content file associated with the received request comprises:
        identifying a sender of the electronic communication;
        determining whether the sender of the electronic communication is authorized to make content available to the media device using at least one of a black list and a white list;
        based on a determination that the sender of the electronic communication is authorized to make content available to the media device, making the streaming content available to the media device by:
            parsing the link to streaming content from the received electronic communication;
            determining that the parsed link corresponds to streaming content,
            in response to the determination that the parsed link corresponds to streaming content, determining whether a previously-stored file of the streaming content exists in electronic storage accessible by the network server system, and
            in response to a determination that a previously-stored file of the streaming content does not exist in electronic storage accessible by the network server system:
                retrieving the streaming content using the parsed link,
                formatting the retrieved content into a new playable file,
                storing the new playable file in electronic storage accessible by the network server system,
                creating access information that enables access to the new playable file, and
                determining the address information for the content file associated with the received request as the created access information
    determining, by the network server system and based on the received request, whether the content file is to be maintained as a private file or a public file, and
    controlling access to the content file by enabling at least the media device to access the content file while preventing other media devices from accessing the content file in response to a determination that the content file is to be maintained as a private file or making the content file available to the media device as well as the other media devices in response to a determination that the content file is to be maintained as a public file.

2. The method of claim 1 wherein formatting the retrieved content into the new playable file comprises transcoding the retrieved content.

3. The method of claim 1 further comprising:
    in response to receiving the request to make the content file available to the media device, identifying at least one attribute of a user and/or a device from which the request was received;
    performing an authentication process using the identified at least one attribute of the user and/or the device;
    determining whether or not to process the received request based on results of the authentication process;
    in response to a determination to process the received request, controlling the media device to access the content file associated with the received request; and
    in response to a determination not to process the received request, ignoring the received request and sending an error message to the user and/or the device from which the request was received.

4. The method of claim 3 wherein performing the authentication process comprises determining whether the user and/or the device is eligible to control the media device to access files by performing at least one of whitelisting and blacklisting.

5. The method of claim 3 wherein performing the authentication process comprises:

determining that the user and/or the device is eligible to make available a subset of available content to the media device based on a type of the available content;

determining a type of the content file associated with the received request;

comparing the determined type of the content file associated with the received request to the type of available content the user and/or the device is eligible to make available; and determining whether the user and/or the device is eligible to make available the content file associated with the received request based on the comparison of the determined type of the content file associated with the received request to the type of available content the user and/or the device is eligible to make available.

6. The method of claim 1 wherein:

the identification information sufficient to enable the network server system to identify the media device comprises a user identifier; and identifying the media device associated with the received request comprises mapping the user identifier to a device identifier for the media device that corresponds to the user identifier.

7. The method of claim 1 wherein:

the identification information sufficient to enable the network server system to identify the media device comprises a device identifier for the media device; and identifying the media device associated with the received request comprises parsing the device identifier for the media device from the received request.

8. The method of claim 1 wherein sending the determined address information for the content file associated with the received request comprises sending a command to access content using the determined address information for the content file associated with the received request to the media device over the established communication session.

9. The method of claim 1 further comprising:

assigning, by the network server system, communication addresses to the multiple, different media devices controlled by the network server system; and allowing a user of the network server system to push content to the user's media device by sending an electronic communication to a communication address assigned to the user's media device by the network server system.

10. The method of claim 1, further comprising controlling the media device of the multiple, different media devices to differentiate content based on an identity of a user that requested the content be made available to the media device such that first content made available to the media device in response to requests received from a first user is distinguished from second content made available to the media device in response to requests received from a second user that is different than the first user.

11. The method of claim 10 wherein controlling the media device of the multiple, different media devices to differentiate content based on an identity of a user that requested the content be made available to the media device such that first content made available to the media device in response to requests received from a first user is distinguished from second content made available to the media device in response to requests received from a second user that is different than the first user comprises:

organizing, in a first channel, first content files made available to the media device in response to requests received from the first user; and organizing, in a second channel that is separate and distinct from the first channel, second content files made available to the media device in response to requests received from the second user.

12. The method of claim 10:

wherein the first user is a regular user that has subscribed to the network server system, wherein the second user is a regular user that has subscribed to the network server system, the second user's subscription to the network server system being separate from the first user's subscription to the network server system, wherein the media device is a first media device that the first user uses to access content from the network server system based on the first user's subscription to the network server system, wherein the second user uses a second media device that is separate from the first media device to access content from the network server system based on the second user's subscription to the network server system, wherein the first user has subscribed to a content channel defined by a content curator, the content curator being different than a regular user that has subscribed to the network server system and having been commissioned to search for, select, and organize multiple types of content from various sources into a channel made available to all users of the network server system; and wherein controlling the media device of the multiple, different media devices to differentiate content based on an identity of a user that requested the content be made available to the media device such that first content made available to the media device in response to requests received from a first user is distinguished from second content made available to the media device in response to requests received from a second user that is different than the first user comprises:

organizing, in a first channel displayed by the first media device, first content files made available to the first media device in response to requests received from the first user;

organizing, in a second channel displayed by the first media device, second content files made available to the first media device in response to requests received from the second user, the second channel being separate and distinct from the first channel; and organizing, in a third channel displayed by the first media device, third content files from the content channel defined by the content curator, the third channel being separate and distinct from the first channel and the second channel.

13. The method of claim 12, further comprising:

receiving, from the first user, a first electronic communication that is addressed to a first address associated with the first media player and that requests to make a first content file available to the first media device;

based on the first electronic communication, adding, by the network server system and to the first channel, the first content file;

receiving, from the second user, a second electronic communication that is addressed to the first address associated with the first media player and that requests to make a second content file available to the first media device;

based on the second electronic communication, adding, by the network server system and to the second channel, the second content file;

detecting that the content curator has added a third content file to the content channel defined by the content curator; and based on the detection that the content curator has added the third content file to the content channel defined by the content curator, adding, by the network server system and to the third channel, the third content file.

14. A method of controlling a media device, the method comprising:

receiving, at a network server system and from a remote device, a request to make a content file available to a media device that is different than the remote device, the request including identification information sufficient to enable the network server system to identify the media device;

based on the identification information, identifying, by the network server system and from among multiple, different media devices, the media device associated with the received request;

determining, by the network server system and based on the received request, address information for the content file associated with the received request;

establishing, by the network server system, a communication session with the media device based on the identification of the media device associated with the received request; and sending the determined address information for the content file associated with the received request to the media device over the established communication session, thereby making the content file associated with the request available to the media device, wherein receiving, at the network server system and from the remote device, the request to make a content file available to a media device that is different than the remote device comprises receiving, from a communications server, an electronic communication having a recipient address that corresponds to at least one of the multiple, different media devices and including an attached content file, wherein identifying the media device associated with the received request comprises mapping the recipient address of the received electronic communication to the media device, wherein determining address information for the content file associated with the received request comprises:

identifying a sender of the electronic communication;

determining whether the sender of the electronic communication is authorized to make content available to the media device using at least one of a black list and a white list;

based on a determination that the sender of the electronic communication is authorized to make content available to the media device, making the attached content file available to the media device by:

extracting the attached content file from the received electronic communication, determining whether a previously-stored version of the extracted content file exists in electronic storage accessible by the network server system, in response to a determination that a previously-stored version of the extracted content file exists in electronic storage accessible by the network server system, identifying access information that enables access to the previously-stored version of the extracted content file and determining the address information for the content file associated with the received request as the identified access information, in response to a determination that a previously-stored version of the extracted content file does not exist in electronic storage accessible by the network server system, storing a new version of the extracted content file in electronic storage accessible by the network server system, creating access information that enables access to the new version of the extracted content file, and determining the address information for the content file associated with the received request as the created access information, determining, by the network server system and based on the received request, whether the attached content file is to be maintained as a private file;

in response to a determination that the attached content file is to be maintained as a private file, controlling access to the attached content file to prevent media devices other than the media device from accessing the attached content file; and in response to a determination that the attached content file is to be maintained as a public file, making the attached content file available to media devices other than the media device, and wherein creating access information comprises:

segmenting the extracted content file into multiple segments, generating a control file that identifies the multiple segments of the extracted content file and includes a tracker that identifies one or more peers in a network at which one or more of the multiple segments of the extracted content file are available, and creating a link to the control file, and determining the address information comprises determining the address information for the content file associated with the received request as the link to the control file.

15. A method of controlling a media device, the method comprising:

receiving, at a network server system and from a remote device, a request to make a content file available to a media device that is different than the remote device, the request including identification information sufficient to enable the network server system to identify the media device;

based on the identification information, identifying, by the network server system and from among multiple, different media devices, the media device associated with the received request;

determining, by the network server system and based on the received request, address information for the content file associated with the received request;

establishing, by the network server system, a communication session with the media device based on the identification of the media device associated with the received request; and sending the determined address information for the content file associated with the received request to the media device over the established communication session, thereby making the content file associated with the request available to the media device;

wherein receiving, at the network server system and from the remote device, the request to make the content file available to the media device that is different than the remote device comprises receiving an electronic communication having a recipient address that corresponds to at least one of the multiple, different media devices and including a link to streaming content;

wherein identifying the media device associated with the received request comprises mapping the recipient address of the received electronic communication to the media device; and wherein determining address information for the content file associated with the received request comprises:

identifying a sender of the electronic communication;

determining whether the sender of the electronic communication is authorized to make content available to the media device using at least one of a black list and a white list;

based on a determination that the sender of the electronic communication is authorized to make content available to the media device, making the streaming content available to the media device by:

parsing the link to streaming content from the received electronic communication;

determining that the parsed link corresponds to streaming content, in response to the determination that the parsed link corresponds to streaming content, determining whether a previously-stored file of the streaming content exists in electronic storage accessible by the network server system, and in response to a determination that a previously-stored file of the streaming content exists in electronic storage accessible by the network server system, identifying access information that enables access to the previously-stored file of the streaming content and determining the address information for the content file associated with the received request as the identified access information, determining, by the network server system and based on the received request, whether the content file is to be maintained as a private file or a public file, and controlling access to the content file by enabling at least the media device to access the content file while preventing other media devices from accessing the content file in response to a determination that the content file is to be maintained as a private file or making the content file available to the media device as well as the other media devices in response to a determination that the content file is to be maintained as a public file.

16. The method of claim 15, wherein the electronic communication is a first electronic communication and the link to streaming content is a first link to first streaming content receiving a second electronic communication having the recipient address and including a second link to second streaming content;

mapping the recipient address of the second electronic communication to the media device;

identifying the sender of the second electronic communication;

determining whether the sender of the second electronic communication is authorized to make content available to the media device using at least one of the black list and the white list;

based on a determination that the sender of the second electronic communication is authorized to make content available to the media device, making the second streaming content available to the media device by:

parsing the second link to the second streaming content from the second electronic communication;

determining that the second link corresponds to streaming content, in response to the determination that the second link corresponds to streaming content, determining whether a previously-stored file of the second streaming content exists in electronic storage accessible by the network server system, and in response to a determination that a previously-stored file of the second streaming content does not exist in electronic storage accessible by the network server system:

retrieving the second streaming content using the second link, formatting the second streaming content into a new playable file, storing the new playable file in electronic storage accessible by the network server system, creating access information that enables access to the new playable file, and sending the created access information to the media device, thereby making the second streaming content associated with the request available to the media device through the new playable file.

17. The method of claim 15, further comprising controlling the media device of the multiple, different media devices to differentiate content based on an identity of a user that requested the content be made available to the media device such that first content made available to the media device in response to requests received from a first user is distinguished from second content made available to the media device in response to requests received from a second user that is different than the first user.

18. The method of claim 17 wherein controlling the media device of the multiple, different media devices to differentiate content based on an identity of a user that requested the content be made available to the media device such that first content made available to the media device in response to requests received from a first user is distinguished from second content made available to the media device in response to requests received from a second user that is different than the first user comprises:

organizing, in a first channel, first content files made available to the media device in response to requests received from the first user; and organizing, in a second channel that is separate and distinct from the first channel, second content files made available to the media device in response to requests received from the second user.

19. The method of claim 17:

wherein the first user is a regular user that has subscribed to the network server system, wherein the second user is a regular user that has subscribed to the network server system, the second user's subscription to the network server system being separate from the first user's subscription to the network server system, wherein the media device is a first media device that the first user uses to access content from the network server system based on the first user's subscription to the network server system, wherein the second user uses a second media device that is separate from the first media device to access content from the network server system based on the second user's subscription to the network server system, wherein the first user has subscribed to a content channel defined by a content curator, the content curator being different than a regular user that has subscribed to the network server system and having been commissioned to search for, select, and organize multiple types of content from various sources into a channel made available to all users of the network server system; and wherein controlling the media device of the multiple, different media devices to differentiate content based on an identity of a user that requested the content be made available to the media device such that first content made available to the media device in response to requests received from a first user is distinguished from second content made available to the media device in response to requests received from a second user that is different than the first user comprises:
- organizing, in a first channel displayed by the first media device, first content files made available to the first media device in response to requests received from the first user;
- organizing, in a second channel displayed by the first media device, second content files made available to the first media device in response to requests received from the second user, the second channel being separate and distinct from the first channel; and
- organizing, in a third channel displayed by the first media device, third content files from the content channel defined by the content curator, the third channel being separate and distinct from the first channel and the second channel.

20. A network server system comprising:
at least one computer; and
at least one computer-readable medium coupled to the at least one computer having instructions stored thereon which, when executed by the at least one computer, causes the at least one computer to perform operations comprising:
- receiving, at the network server system and from a remote device, a request to make a content file available to a media device that is different than the remote device, the request including identification information sufficient to enable the network server system to identify the media device;
- based on the identification information, identifying, by the network server system and from among multiple, different media devices, the media device associated with the received request;
- determining, by the network server system and based on the received request, address information for the content file associated with the received request;
- establishing, by the network server system, a communication session with the media device based on the identification of the media device associated with the received request; and
- sending the determined address information for the content file associated with the received request to the media device over the established communication session, thereby making the content file associated with the request available to the media device;
- wherein receiving, at the network server system and from the remote device, the request to make the content file available to the media device that is different than the remote device comprises receiving, from a communications server, an electronic communication having a recipient address that corresponds to at least one of the multiple, different media devices and including a link to streaming content;
- wherein identifying the media device associated with the received request comprises mapping the recipient address of the received electronic communication to the media device; and
- wherein determining address information for the content file associated with the received request comprises:
  - identifying a sender of the electronic communication;
  - determining whether the sender of the electronic communication is authorized to make content available to the media device using at least one of a black list and a white list;
  - based on a determination that the sender of the electronic communication is authorized to make content available to the media device, making the streaming content available to the media device by:
    - parsing the link to streaming content from the received electronic communication;
    - determining that the parsed link corresponds to streaming content,
    - in response to the determination that the parsed link corresponds to streaming content, determining whether a previously-stored file of the streaming content exists in electronic storage accessible by the network server system,
    - in response to a determination that a previously-stored file of the streaming content exists in electronic storage accessible by the network server system, identifying access information that enables access to the previously-stored file of the streaming content and determining the address information for the content file associated with the received request as the identified access information, and
    - in response to a determination that a previously-stored file of the streaming content does not exist in electronic storage accessible by the network server system:
      - retrieving the streaming content using the parsed link,
      - formatting the retrieved content into a new playable file,
      - storing the new playable file in electronic storage accessible by the network server system,
      - creating access information that enables access to the new playable file, and
      - determining the address information for the content file associated with the received request as the created access information,
  - determining, based on the received request, whether the content file is to be maintained as a private file or a public file;
  - in response to a determination that the content file is to be maintained as a private file, controlling access to the content file by enabling at least the media device to access the content file while preventing other media devices from accessing the content file; and
  - in response to a determination that the attached content file is to be maintained as a public file, making the content file available to the media device as well as the other media devices.

* * * * *